(12) United States Patent
Gupta et al.

(10) Patent No.: US 12,436,667 B2
(45) Date of Patent: Oct. 7, 2025

(54) OPERATING SYSTEM FACILITATION OF CONTENT SHARING

(71) Applicant: MICROSOFT TECHNOLOGY LICENSING, LLC, Redmond, WA (US)

(72) Inventors: Ravi Gupta, Seattle, WA (US); Martin A. McClean, Seattle, WA (US); Man Hei Julia Wong, Seattle, WA (US); Peter E. Hammerqist, Shorline, WA (US); Gabriel S. Martinez, Seattle, WA (US); Colin Ray Anthony, Seattle, WA (US); Srinivas Chakravarthula, Kirkland, WA (US); Jeffrey Scott Petty, Seattle, WA (US); Nithin Adapa, Seattle, WA (US); Jason P. Howard, Magnolia, TX (US); Hanna L. McLaughlin, Seattle, WA (US); Cindy Moline, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 238 days.

(21) Appl. No.: 17/698,935

(22) Filed: Mar. 18, 2022

(65) Prior Publication Data
US 2023/0297961 A1    Sep. 21, 2023

(51) Int. Cl.
*G06F 3/04842*    (2022.01)
*G06F 3/04817*    (2022.01)
(Continued)

(52) U.S. Cl.
CPC ...... *G06F 3/04842* (2013.01); *G06F 3/04817* (2013.01); *G06F 9/45512* (2013.01); *H04L 12/1822* (2013.01)

(58) Field of Classification Search
CPC ............. G06F 3/04842; G06F 3/04817; G06F 9/45512; H04L 12/1822
See application file for complete search history.

(56) References Cited

U.S. PATENT DOCUMENTS

| 7,665,031 B2 | 2/2010 | Matthews et al. |
| 9,374,326 B2 | 6/2016 | Barton |

(Continued)

FOREIGN PATENT DOCUMENTS

| CN | 105159521 A | 12/2015 |
| CN | 108304226 A | 7/2018 |

OTHER PUBLICATIONS

Hiroyuki Kasaim Efficent Seamless Content Sharing Among Saparate Multiple WLANs for Pervasive Mobile Network Environment, Jan. 1, 2013, IEEE International Conference on Consumer Electronics, pp. 210-211 (Year: 2013).*

(Continued)

*Primary Examiner* — Tam T Tran
(74) *Attorney, Agent, or Firm* — Shook, Hardy & Bacon LLP

(57) ABSTRACT

Various embodiments discussed herein are directed to improving existing technologies by enabling users to share content items directly from an operating system component, with little to no user interface input requirements at the underlying communications application. For instance, some embodiments receive an indication that a mouse pointer is hovering over an operating system taskbar icon and automatically produce a flyout window so that a user can share a currently opened application page to other users via a selection of a button within the flyout window. Such application page may be shared via a single selection at the flyout window or an additional "are you sure" or confirmation step. In this way, excessive drilling, navigation, and other user input at the application is reduced and simplified, thereby (Continued)

improving the user experience, content sharing accuracy, and computer resource consumption, among other improvements.

20 Claims, 14 Drawing Sheets

(51) Int. Cl.
*G06F 9/455* (2018.01)
*H04L 12/18* (2006.01)

(56) References Cited

U.S. PATENT DOCUMENTS

| | | | |
|---|---|---|---|
| 10,924,528 B1* | 2/2021 | Korobov | H04L 67/12 |
| 12,309,219 B2* | 5/2025 | Wang | H04L 67/06 |
| 2007/0128899 A1 | 6/2007 | Mayer | |
| 2011/0145327 A1* | 6/2011 | Stewart | G06F 16/4393 |
| | | | 709/217 |
| 2011/0307738 A1 | 12/2011 | Hilerio et al. | |
| 2012/0096364 A1* | 4/2012 | Wilkinson | H04L 67/63 |
| | | | 715/740 |
| 2013/0061164 A1 | 3/2013 | Chen et al. | |
| 2016/0150063 A1* | 5/2016 | Choi | H04M 1/72403 |
| | | | 455/414.1 |
| 2017/0322818 A1 | 11/2017 | Schechter et al. | |
| 2020/0126515 A1* | 4/2020 | Khudyakov | G09G 5/14 |

OTHER PUBLICATIONS

Anika Seufert et al., Share and Multiply: Modeling Communication and Generated Traffic in Private WhatsApp Groups, Jan. 1, 2023, IEEE Access, vol. 11, pp. 25401-25414 (Year: 2023).*
"ShareWindowCommandSource Class", Retrieved From: https://docs.microsoft.com/en-us/uwp/api/windows.ui.shell.sharewindowcommandsource?view=winrt-22000, Retrieved on Nov. 23, 2021, 4 Pages.

* cited by examiner

OPERATING SYSTEM FACILITATION OF CONTENT SHARING

INTRODUCTION

Computer-implemented technologies can assist users in communicating with each other over communication networks. For example, some teleconferencing technologies use conference bridge components that communicatively connect multiple user devices over a communication network so that users can conduct meetings or otherwise speak with each other. In another example, communications applications can include instant messaging, chat functionality, and/or audio-visual exchange functionality via webcams and microphones so that users can communicate in near-real-time. These communications applications can include functionality that allows a user to share content (such as the user's screen) to other users. However, these technologies are complex and arduous to use because of the unnecessary drill down and navigation within the application user interface required for sharing content, thereby negatively impacting the user experience and human-computer interaction. Moreover, these technologies are also deficient with respect to content sharing accuracy, computer information security, user privacy, and computer resource consumption (such as input/output (I/O)), among other deficiencies.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to improving existing technologies by enabling users to share content items (such as an opened application window) directly from an operating system component (such as a taskbar) with little to no user interface input requirements at the underlying communications application. For example, some embodiments receive an indication that a mouse pointer is hovering over a taskbar icon of an operating system shell and automatically produce a flyout window so that a user can share a currently opened application page to other users via a selection of a button within the flyout window. Such application page may be shared via a single selection at the flyout window or an additional "are you sure" or confirmation step. In this way, excessive drilling, navigation, and other user input at the application is reduced and simplified, thereby improving the user experience, content sharing accuracy, human-computer interaction, and computer resource consumption, among other improvements.

BRIEF DESCRIPTION OF THE DRAWINGS

The present invention is described in detail below with reference to the attached drawing figures, wherein.

DETAILED DESCRIPTION

Figure 1:
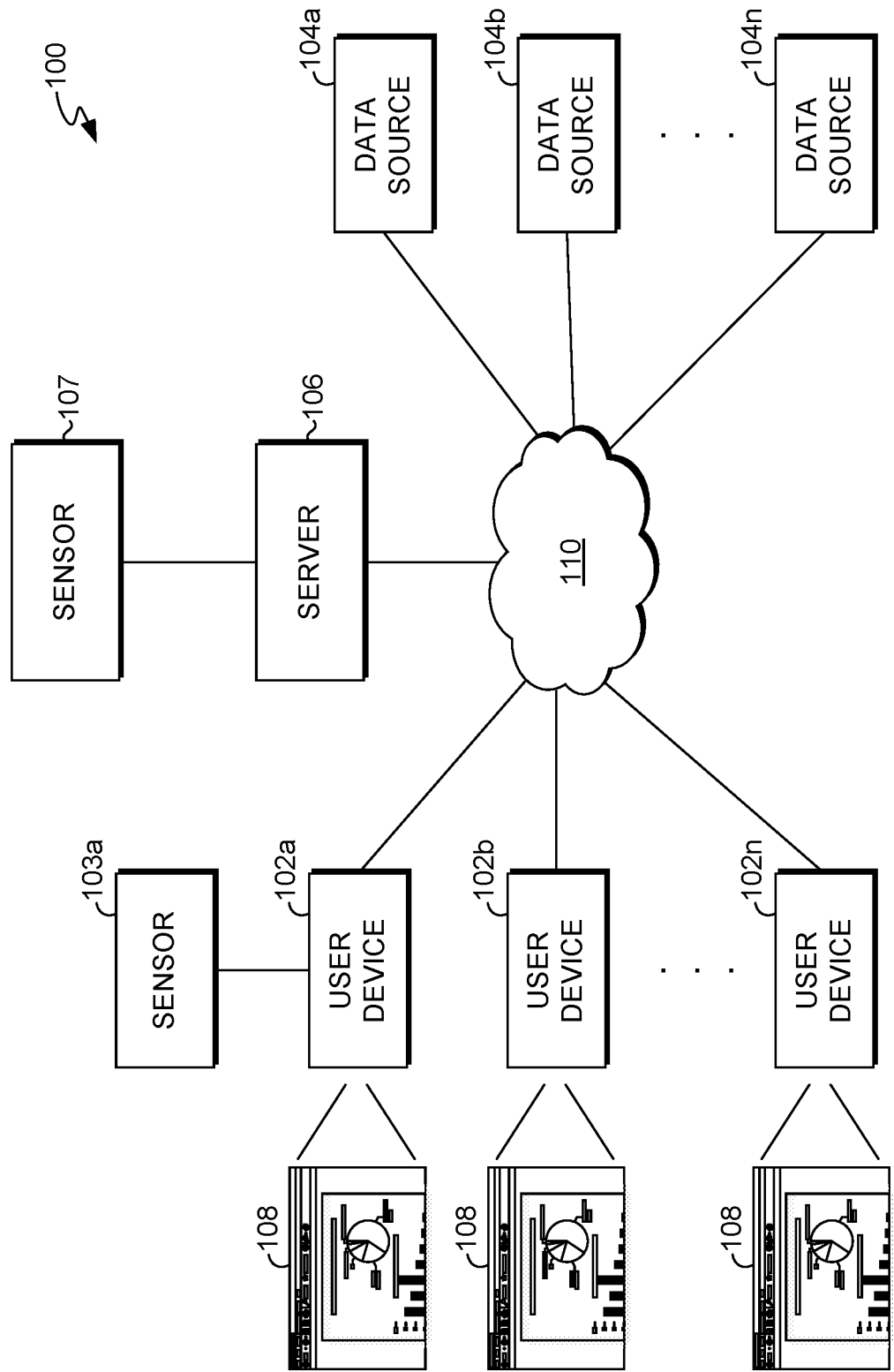
FIG. 1 is a block diagram illustrating an example operating environment suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As described above, existing technologies are complex and arduous to use because of the unnecessary drill down and navigation within the application user interface required for content sharing. For example, some communications applications require users to click on a "share screen" button at the application. Once such selection is made, further drill down is required at the application because the user must then choose whether the user wants to share an entire screen (such as a desktop) that the user sees, or an application page the user has open. In order to make such decision, however, the user may be further required to scroll down to find a thumbnail (a miniature view) of the application page they are looking for, because the user may have many application pages open, and their corresponding thumbnails can take up a lot of visual space. Further, it can be hard to see what contents are inside of the thumbnails because of the small size, thereby making it even more difficult to see what each application page corresponds to. Making sharing even more difficult is that these applications may have a drop-down user interface element included within the "share content" button so that users can set sharing parameters, such as the ability to share application pages simultaneously or one at a time. But users often click this drop-down user interface element, believing that it allows them to share content directly, thereby further confusing the user or further delaying the sharing of content. Therefore, these user interfaces negatively impact the user experience and human-computer interaction. Each of these features makes it difficult to navigate the application quickly in real-time to be able to share content.

In another example, some applications also require a user to click on a "share content" button. However, such button may not be clearly labeled as a sharing button but may rather be just a symbol, thereby requiring the user to navigate through various user interface features of a communication application before the user finds the share content button. In response to a click of the "share content" button, these applications require further complex navigation and drill down by surfacing multiple options, such as whether the user wants to share their entire screen or only certain application windows, whether the user wants the content alone to be visible or whether the user wants to be visible along with the content, whether the user wants to collaborate with other users using whiteboard functionality, and the like. However, the sheer quantity of options can confuse the user and cause a delay in the sharing of content. Moreover, once the user determines that they want to, for example, share an opened application window, these technologies require even further drilling. For example, in response to receiving a selection of the "window" button, these applications cause presentation of a representation of each opened application window. These application windows correspond to previews of the application pages or application instance the user currently has open and are available to share. As such, these application windows take up a lot of visual space, such that the user often has to perform even more navigation, such as scrolling down the list of application windows to find the correct application window the user wants to share. Moreover, these applications require users to click on additional user interface elements to stop and/or change the content they are sharing, thereby disrupting communications. Therefore, these user interfaces negatively impact the user experience and human-computer interaction. Each of these features makes it difficult to navigate the application quickly in real-time to be able to share content.

Existing technologies are also deficient with respect to the accuracy of sharing content. As described above, some applications include a "share screen" button. Sharing a screen may correspond to sharing all the information a user has open on a desktop. However, such "share screen" indicia can be confusing to users, as they may interpret this to mean only that a particular application window or application page will be shared instead of their entire desktop, and they may accordingly accidentally share their entire screen instead of a particular application window or application page. Further, as described above, some applications give thumbnails or application page views of the content that users may share. However, such application page views may contain small font or are otherwise hard to identify. As such, the user may select the incorrect content to share, thereby negatively impacting human-computer interaction and the accuracy of content sharing.

Existing technologies are also deficient with respect to computer information security and user privacy. As described above, some applications include a "share screen" button or other user interface element. However, such "share screen" indicia can be confusing to users, as described above, and they may accordingly accidentally share their entire screen instead of a particular application window or application page. These applications do not include any sort of access control mechanism, such as a confirmation notification indicating that the user is about to share everything on a desktop. As such, not only is human-computer interaction negatively impacted, but sensitive information such as passphrases, email content, proprietary work product, or other sensitive information may be shared to other users because the entire desktop is shared.

Computers also consume an unnecessary amount of computing resources, such as I/O, when using these existing technologies. For example, as described above, existing applications require extensive drill down, navigation, and other user input steps in order to share content. However, such repetitive user input increases storage device I/O (excess physical read/write head movements on non-volatile disk) because each time a user input is received, components have to repetitively reach out to the storage device to perform a READ or WRITE operation, which is error prone and wears on components, such as a read/write head.

Various embodiments of the present disclosure provide one or more technical solutions to these technical problems, as well as other problems, as described herein. For instance, particular embodiments are directed to enabling users to share content items (e.g., an application window) directly from an operating system component (e.g., a task switcher) with little to no user interface input requirements at the underlying communications application. For example, some embodiments allow the user to hover over the taskbar of the operating system and share an application window to a plurality of users via a selection of a button within a flyout window of the taskbar. Such application window may be shared via a single selection at the flyout window in the taskbar or an additional "are you sure" or confirmation step. In this way, excessive drilling, navigation, and other user input at the application is reduced, thereby improving the user experience, content sharing accuracy, and computer resource consumption, among other improvements.

In operation, some embodiments first establish a connection between an operating system shell of an operating system and a client application (e.g., MICROSOFT TEAMS), where the client application is configured to facilitate electronic communication between multiple users. For example, in response to receiving an indication that a meeting or communication session (e.g., a call) associated with the client application has begun, the client application can call a function of an Application Programming Interface (API) associated with the operating system so that the operating system can then handle any user engagement or selections of corresponding data objects (e.g., application window icons) within the task bar or other operating system component in preparation to share content via communication with the client application.

Subsequent to the establishing of the connection, some embodiments receive another indication of user engagement (e.g., a hovering action) of a first data object (e.g., an icon representing an application window) included in an operating system component (e.g., a task bar) of the operating system shell. The first data object may represent, indicate, or otherwise be associated with a first content item. Such user engagement may be associated with a user request to share the first content item to various users via the client application. For example, some embodiments receive an indication that a graphical control element included in an application window icon has been activated based on a visual cursor (such as a mouse pointer) hovering over the graphical control element without user selection of the graphical control element. Responsively, such embodiments cause presentation of a flyout window of the operating system shell that includes a user interface element (such as a button) so that the user can immediately share the first content item with multiple users. For instance, the user can share a near-real-time view of a word processing application page that the user has open.

Particular embodiments improve existing technologies because they reduce drill down and navigation within the user interface required for content sharing such that they are not as complex and arduous to use. Such reduction in drilling and navigation occurs because particular embodiments allow users to directly share content items via a single user selection (or fewer user selections) of a data object within an operating system component without requiring any user selections or interface with the client application itself. Accordingly, one technical solution is the concept of receiving an indication of user engagement of a particular data object included in the operating system component, where the user engagement is associated with a user request to share the content item to various users.

Accordingly, unlike existing technologies, these embodiments do not require users to click on a "share screen" button at the communications application or any further drill down at the communications application, such as querying whether the user wants to share the entire screen (such as a desktop) that the user sees, or an application page (such as a thumbnail) the user has open. The user is also not required to scroll down to find the application page or application window they are looking for. In other words, users can quickly and simply share content items directly from familiar operating system elements without any user interaction with the client application itself. Therefore, embodiments provide user interface techniques that improve existing user interfaces, the user experience, and human-computer interaction. Each of these features makes it relatively easier to quickly navigate in real-time to be able to share content.

Some embodiments also improve the accuracy of sharing content relative to existing technologies. As described above, some applications include a "share screen" button. Sharing a screen may correspond to sharing all the information a user has open on a desktop. However, such "share screen" indicia can be confusing to users, as they may interpret this to mean only that a particular application window or application page will be shared instead of their entire desktop, and they may accordingly accidentally share their entire screen instead of a particular application window or application page. However, particular embodiments provide an "are you sure" or confirmation button confirming that the user wants to share a particular screen or an individual content item of a screen. Accordingly, another technical solution is receiving an indication that a user interface element has been selected, where the user interface element corresponds to a confirmation that the user wants to share a particular content item. In this way, the user is less likely to accidentally share the user's entire screen or other content items, thereby improving the accuracy of sharing content items.

Further, as described above, some applications give previews, thumbnails, application page views (or other previews) of the content that users may share. Such application page views may contain small font or are otherwise hard to identify. As such, the user may select the incorrect content to share, thereby negatively impacting human-computer interaction and the accuracy of content sharing. However, particular embodiments of the present disclosure improve such human-computer interaction and accuracy of content sharing by causing presentation of content via a selection of data objects within a task bar and/or other operating system components, such as a popup or flyout window. A task bar in some embodiments is a user interface shell component of an operating system located at the bottom of the screen that indicates which programs are currently running or have not been closed out, shortcuts to programs, notifications, and a start menu button. In various embodiments, task bars efficiently indicate, to users, which applications are currently running and are available to be shared because of the icons that make them easily distinguishable. Further, in some embodiments, operating system flyout windows indicate filenames and the like. Accordingly, another technical solution is the usage of task bars or other operating system components, such as flyout windows, to share content items. In this way, users are more likely to accurately identify the content they want to share relative to the application page previews of existing technologies.

Particular embodiments improve existing technologies with respect to computer information security and user privacy. As described above, "share screen" indicia can be confusing to users, as they may interpret this to mean only that a particular application window or application page will be shared, and they may accordingly accidentally share their entire desktop screen instead of a particular application window or application page. However, various embodiments include an access control mechanism, such as a requirement of performing an additional step of selecting a confirmation button indicating that the user is about to share a particular application window or other content item. Accordingly, another technical solution is receiving an indication that a user interface element has been selected, where the user interface element corresponds to a confirmation that the user wants to share particular content item(s). Further, in some embodiments, there is no option to share a user's entire screen from operating system components. Accordingly, another technical solution is the concept of being only able to share individual application windows, application pages, or applications. In this way, the user is less likely to accidentally share the user's entire desktop screen or other content items, thereby reducing the likelihood that sensitive information, such as passphrases, email content, and the like will be shared.

Particular embodiments also improve computer resource consumption, such as reducing I/O, relative to existing technologies. For example, as described above, existing technologies require extensive drill down, navigation, and other user input steps at the communications application in order to share content. However, such repetitive user input increases storage device I/O because each time a user input is received, components have to repetitively reach out to the storage device to perform a READ or WRITE operation, which is error prone and wears on components, such as a read/write head. However, as described herein, various embodiments require less drill down, navigation, and other user input steps, which means that the storage device is accessed fewer times, thereby reducing wear on read/write head or other memory access components. Accordingly, a technical solution is the incorporation of data objects, such as task bar icons, task bars, flyout windows, or other operating system components for content sharing so that the user can directly share content via a selection or user engagement of these components, as opposed to requiring additional drilling and navigation at the client application itself. The user engagement or selection of such operating system components to share content requires less drill down, navigation, and other user input relative to existing technologies. As such, there is reduced I/O at the storage device level.

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (for example, databases or other data stores), such as data sources 104a and 104b through 104n; server 106; sensors 103a and 107; and network(s) 110. It should be understood that environment 100 shown in FIG. 1 is an example of one suitable operating environment. Each of the components shown in FIG. 1 may be implemented via any type of computing device, such as computing device 1100 as described in connection to FIG. 11, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 102a or server 106 alternatively or additionally comprises one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 11 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, corpus, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n or server 106.

Figure 2:
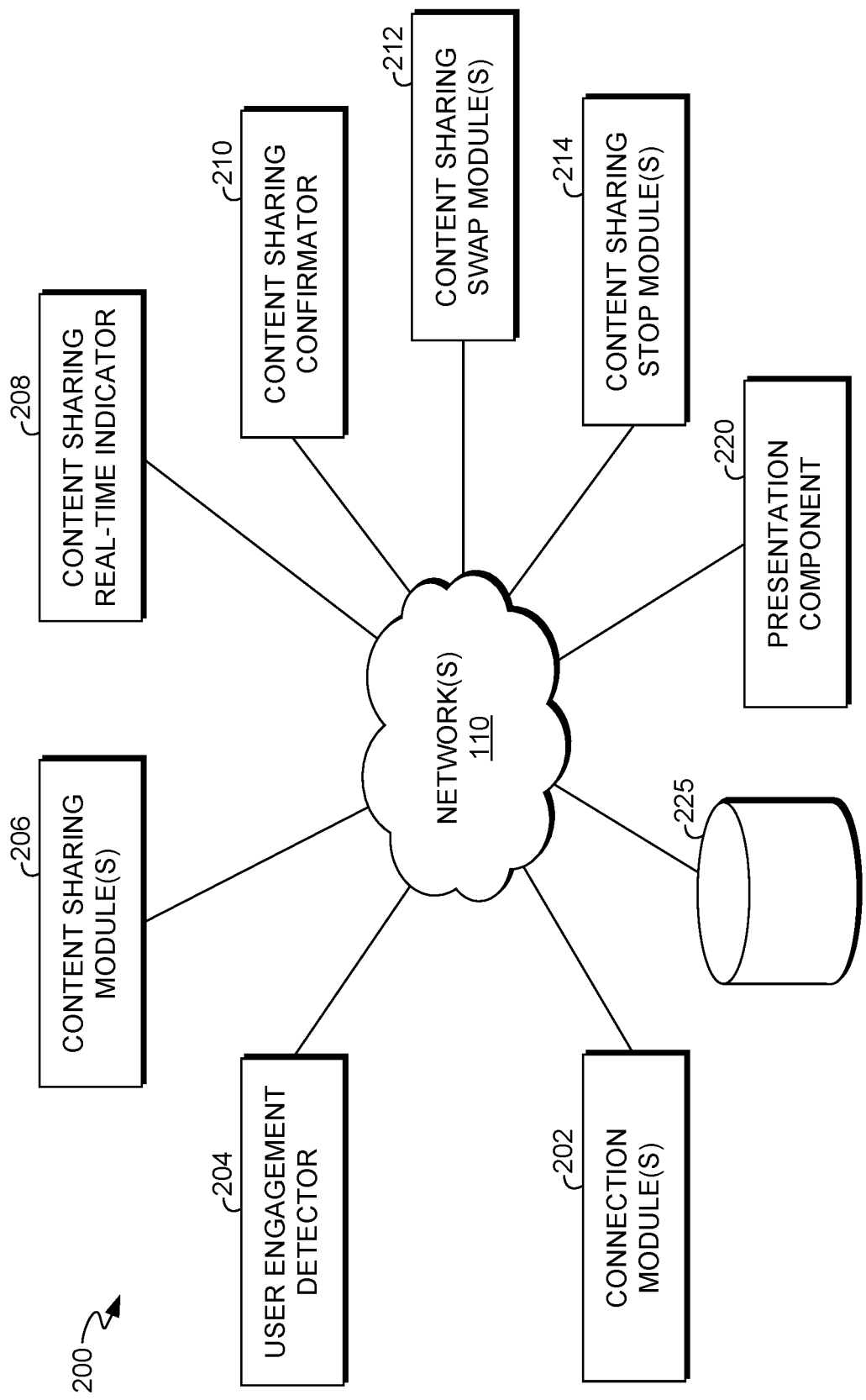
FIG. 2 is a block diagram depicting an example computing architecture suitable for implementing some embodiments of the disclosure.

Operating environment 100 can be utilized to implement one or more of the components of the system 200, described in FIG. 2, including components for sharing content items, as described herein. Operating environment 100 also can be utilized for implementing aspects of processes 500, 600, 700, 800, 900, and/or 1000 described in conjunction with FIGS. 5 through 10, and any other functionality as described in connection with FIGS. 2-11. As illustrated in FIG. 1, the user device 102a may share or transmit the content item 108 (e.g., an application page) over the network(s) 110 to the other user devices 102b and 102n in a manner described herein. Accordingly, each display screen of each of the user devices 102a, 102b, and 102n contain the same view of the content item 108 via a share request.

Referring now to FIG. 2, with FIG. 1, a block diagram is provided showing aspects of an example computing system architecture suitable for implementing some embodiments of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network(s) 110, which is described in connection to FIG. 1, and which communicatively couples components of system 200 including the connection module(s) 202, the user engagement detector 204, the content sharing module(s) 206, the content sharing real-time indicator 208, the content sharing confirmator 210, the content sharing swap module(s) 212, the content sharing stop module(s) 214, the presentation component 220, and storage 225. These components may be embodied as a set of compiled computer instructions or functions, program modules, computer software services, or an arrangement of processes carried out on one or more computer systems, such as computing device 1100 described in connection to FIG. 11, the user device 102a, and/or the server 106, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, the connection module(s) 202 is generally responsible for establishing a connection between an operating system (or component thereof, such as a shell) and a client application. The connection module(s) 202 may be included within the operating system, the client application, or both. In other words, the operating system, client application, or both can establish a connection. In some embodiments, to establish a connection generally means to open a communication session between operating system and client application so that these components can request and responsively provide data, such as being able to programmatically call different functions for content item sharing capabilities. Before such connection is established, communication between these components may not occur with respect to sharing content items. For example, in response to receiving an indication that a user has hovered over or selected an open application window icon in a task bar, the operating system may simply display a thumbnail of the application window or display an expanded view of the application window as opposed to providing a flyout window with a button to share the corresponding application window to other users, as described in more detail herein. In some embodiments, where the client application is remote or not included in the same host or computing device as the operating system, establishing a connection can include opening a channel via a three-way TCP/IP handshake so that these components can communicate with each other over a network.

Establishing a connection between an operating system and client application allows the operating system to communicate with the client application when user engagement has been detected, which is indicative of a request to share content items. In other words, the operating system can receive indications of different types of user engagement for sharing content and, in response the client application can be caused to share content, among other things, as described in more detail below.

In some embodiments, the establishing of the connection is automatically triggered via particular predetermined events or time periods. For example, in some embodiments, the establishing of the connection automatically occurs in response to receiving an indication that a meeting or communication session associated with the client application has begun. For instance, in response to detecting a meeting start time or particular voice of a meeting participant, the client application may issue a programmatic call to the operating system to establish a connection. Such detection can be based on reading a data structure that indicates the time a meeting will start, detecting that one or more users have selected a meeting link, and/or reading user IDs populated in a container (indicating that one or more users are awaiting for a meeting to start). Alternatively in some embodiments, the establishing of the connection occurs in response to receiving an indication that the client application has been opened or selected to run, which typically occurs before a call or meeting starts. Alternatively in some embodiments, the establishing of the connection occurs after some predetermined time after the client application has been opened, such as 30 seconds or 60 seconds.

The user engagement detector 204 is generally responsible for detecting any suitable user engagement. "User engagement" as described herein refers to any suitable input provided by a user via a user interface, such as a mouse click input, a touch gesture input, a hovering of a cursor over a control element of a user interface without explicit user selection, a keyboard input, a voice command or utterance (e.g., a voice assistant "wake word"), or the like. In some embodiments, the user engagement detector 204 resides at the operating system, the client application, or both. In an illustrative example of the user engagement detector 204, an operating system taskbar component can receive an indication that a graphical control element included in an application window icon has been activated based on a visual cursor (e.g., a mouse pointer) hovering over the graphical control element without explicit user selection. In other words, the user engagement detector 204 can detect that a cursor is hovering over an application window icon based on the user moving the cursor over the application window icon.

The content sharing module(s) 206 is generally responsible for causing the sharing of content items based on detecting the user engagement via the user engagement detector 204. The content sharing module(s) 206 may reside at the operating system, the client application, or both. In some embodiments, where the content sharing module(s) 206 resides at the operating system, the content sharing module(s) 206 produces additional operating system shell elements, such as a flyout window and a button within the flyout window near the task bar to allow the actual sharing of the application window. A "flyout" window as described herein refers to a lightweight visual container or popup window that displays information related to what the user is doing. Unlike a dialog box, for example, a flyout can be quickly dismissed by tapping or clicking somewhere outside of the flyout, pressing the escape (Esc) key or "back" button, resizing the app window, or changing the device's orientation. Dialog boxes alternatively block interactions and prevent users from doing anything else until they interact with the dialog.

In an illustrative example of the content sharing module(s) 206 from the operating system perspective, in response to detecting a hovering of a cursor over an application or application window icon at a task bar, the operating system can automatically produce a flyout window that includes a button. A user selection of the button causes the corresponding content item to be shared. In some embodiments, if a content sharing module(s) 206 is included in the client application, it is the component directly responsible for sharing content items, such as causing an application window to be displayed to various user devices in a meeting or communication session.

It is understood that in some embodiments to "share" a content item means that the content item—the way it is viewed by a user requesting to share the content item—is identically caused to be distributed to other user devices of other users, such that the other users view the content item in the exact same manner the requesting user sees it without having to open a corresponding link or file. For example, a particular application or file may have several program flow points, components, or application pages (e.g., "activities" in Android OS) and the user may only have a first page of the application or file displayed. When a user shares a content item, the user is sharing only that first application page, as opposed to the entire particular application or other features on a desktop (such as other content items). Such first application page is automatically shared to other users without the other users having to click on a link or otherwise open the application page. This is distinguishable from certain types of content sharing, such as sending attachments, files, links, or the like, where an entire application or file is shared and the user has to open such file. Sharing in some embodiments does not require the user to open any file or attachment. Rather, the view or application page that is open at the sharing user's device (as indicated in the sharing user's taskbar) is automatically produced to the other users.

In some embodiments, not only is the view from the sharing request user duplicated and distributed across other user devices, but any user engagement from the sharing request user is also duplicated and distributed. For example, a first user may request to share a first application window of word processing application. Subsequent to the first application window being transmitted across other user devices, the user may move his or her mouse, click a tab, enter text, delete text, interact with the application window via voice, or the like. In response to receiving an indication of these user inputs, particular embodiments automatically cause such user inputs to occur on all of the other application windows on all of the other user devices. In this way, such sharing is indicative of producing a live near-real-time video feed or stream (a sequence) of data indicating a view of an application and each user action the requesting user (or sharer) is taking. For example, the content item can be a slide show presented by a sharing user (or presenter) at a meeting or communication session. Each time the presenter moves to a different slide, such actions are responsively, and in near-real-time, duplicated across all other user device screens of the other users attending the meeting or communication session.

The content sharing real-time indicator 208 is generally responsible for causing presentation of an indicator that indicates a specific content item is currently being shared. For example, the content sharing real-time indicator 208 can cause presentation of a colored (e.g., red) and or otherwise highlighted (e.g., bolded) outline that borders around an icon (or other data object) in a task bar, which indicates that a corresponding application window (e.g., an opened word processing application page) is currently being shared. In other words, when a content item is not being shared, the specific data object corresponding to a particular content item does not have such an outline surrounding it. In this way, the user is easily able to see and/or confirm what content item is being shared. In another example, the content sharing real-time indicator 208 can additionally or alternatively cause presentation of an outline around the actual content item displayed (e.g., a particular document or application page associated with the icon in the taskbar). The indicators described with respect to the content sharing real-time indicator 208 need not be color-specific indicators or outlines, but can alternatively or additionally be auditory indicators or other types of visual indicators, such as an icon, symbol, or notification indicating a particular content item is being shared.

The content sharing confirmator 210 is generally responsible for providing functionality for confirmation that a user wants to share a specific content item. For example, in response to receiving an indication that the user has selected a "share this window" button in a flyout window, the content sharing confirmator 210 automatically produces another button corresponding to a confirmation that the user wishes to share the content item. In response to receiving an indication that the user has selected such other button, the content sharing confirmator causes presentation of the content item. It is understood that the content sharing confirmator 210 need not be present within the system 200. Rather, the content items can alternatively be produced via the content sharing module(s) 206, as described above.

The content sharing swap module(s) 212 is generally responsible for automatically switching which content items are shared. As described herein, existing technologies require users to explicitly stop, via an application button, sharing a first content item before being able to share a second content item. Such requirements can disrupt presentation and communication flow. As such, some embodiments of the present techniques automatically halt the sharing of the first content item and automatically cause the second content item to be provided to a plurality of user devices associated with a plurality of users based on a user request to share the second content item (as opposed to a user request to halt the first content item first). In other words, users do not have to click on a "stop" button (either at the operating system or application) if the user desires to share something else. Rather, the user can simply select another content item for sharing, which will automatically cause the sharing of the current content item to stop.

The content sharing stop module(s) 214 is generally responsible for stopping the presentation of content. The content sharing stop module(s) 214 may be included in the operating system, client application, or both. In some embodiments, where the content sharing stop module(s) 214 resides in an operating system, it produces user interface elements, such as a "stop" button so that the user can stop sharing content via the operating system shell. In some embodiments, where the content sharing stop module(s) 214 resides in the client application, it is responsible for actually stopping the feed or sharing of the content item so that it is no longer caused to be produced to the other user devices.

Example system 200 also includes a presentation component 220 that is generally responsible for causing presentation of content and related information to a user, in response to receiving a request to share content among a plurality of users. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented. In particular, in some embodiments, presentation component 220 applies content logic to device features, associated logical hubs, inferred logical locations, or sensed user data to determine aspects of content presentation.

In some embodiments, presentation component 220 generates user interface features (or causes generation of such features) associated with content items, such as described with respect to FIGS. 4A through 4D. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 220 determines when and how to present the content. In such embodiments, the content, including content logic, may be understood as a recommendation to the presentation component 220 (and/or personal assistant service or application) for when and how to present the notification, which may be overridden by the personal assistant app or presentation component 220.

In some embodiments, the presentation component 220 takes, as input, functionality performed by the user engagement detector 204, the content sharing module(s) 206, the content sharing real-time indicator 208, the content sharing confirmator 210, the content sharing swap module(s) 212, and/or the content sharing stop module(s) 214, in order to produce corresponding user interface features. For example, in some embodiments the presentation component 220 decodes a set of data produced by the content sharing module(s) 206 and mathematically expresses a "share this window" button within a flyout window and renders the actual graphical user interface button using the mathematical expression as the function to set the intensity of a field of RGB colors or otherwise actually structure the button according to the mathematical expression.

Example system 200 also includes storage 225. Storage 225 generally stores information including data, computer instructions (for example, software program instructions, routines, or services), data structures, and/or models used in embodiments of the technologies described herein. By way of example and not limitation, data included in storage 225, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, data or information (for example, the requested content) may be provided in user signals. A user signal can be a feed of various data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

Figure 3:
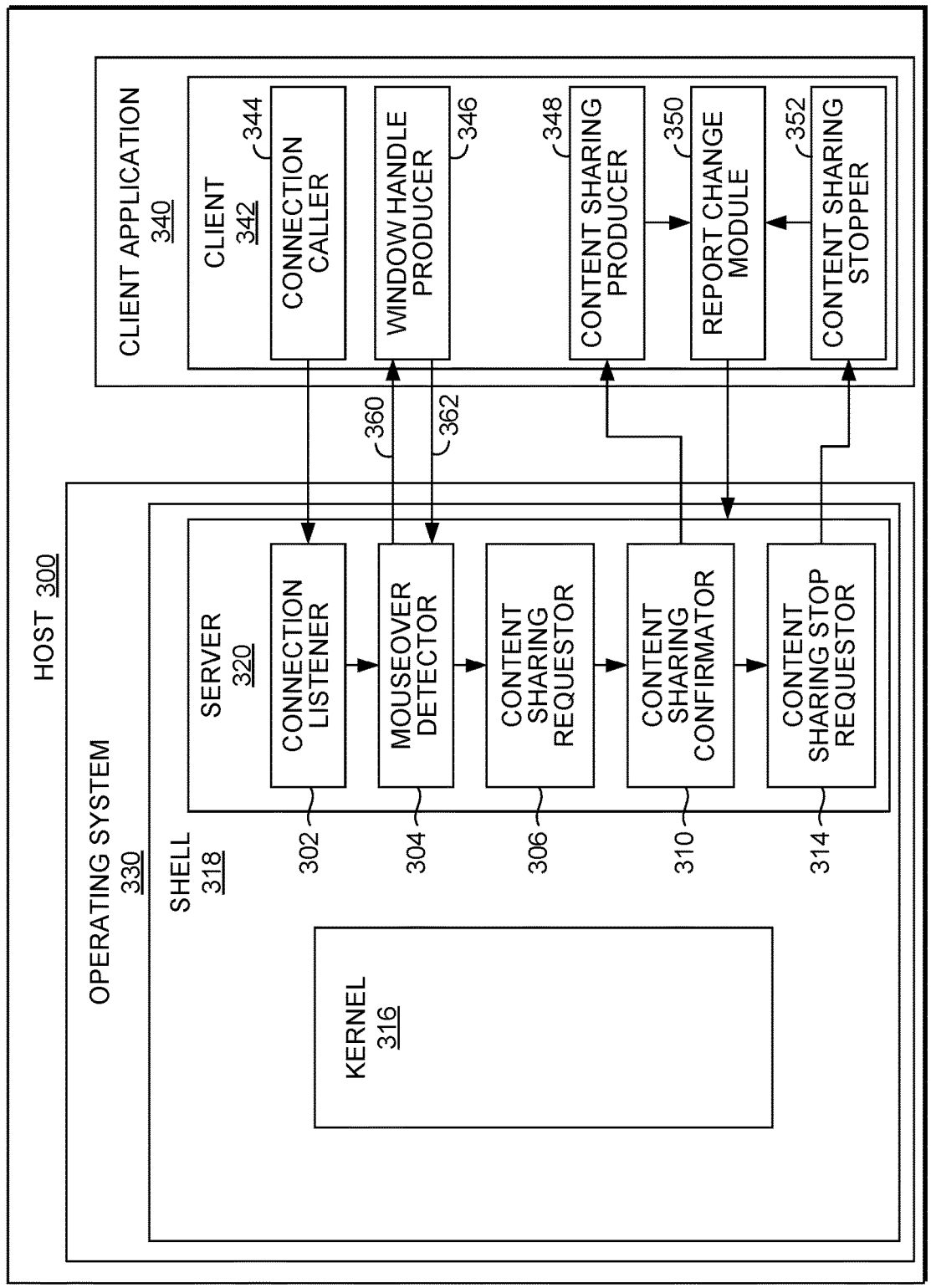
FIG. 3 is a block diagram of an example system for sharing content via communication between an operating system and a client application of a host, according to some embodiments.

FIG. 3 is a block diagram of an example system 300 for sharing content via communication between an operating system 330 and a client application 340 of a host 300 (e.g., a computing device), according to some embodiments. In some embodiments, the client application 340 (or only a portion of the client application 340, such as the content sharing producer 348) is alternatively located at another host relative to the operating system 330 instead of on the same host 300. In some embodiments, one or more of the components of the system 300 include the same or similar functionality with corresponding components of the system 200 of FIG. 2. For example, in some embodiments, the connection caller 344 and the connection listener 302 are included in the connection module(s) 202 of FIG. 2. Likewise, the mouseover detector 304 may be included in the user engagement detector 204. Likewise, the content sharing requestor 306 and the content sharing producer 348 may be included or be a part of the content sharing module(s) 206 of FIG. 2. Likewise, the content sharing confirmator 310 may represent the content sharing confirmator 210 of FIG. 2. The content sharing stop requestor 314 and the content sharing stopper 352 may also be included within or be a part of the content sharing stop module(s) 214 of FIG. 2.

The host 300 includes the operating system 330 and the client application 340. In some embodiments, the host 300 is included in or represents the user device 102a of FIG. 1 or the computing device 1100 of FIG. 11. In some embodiments, the client application 340 alternatively resides within the server 106 of FIG. 1. The host 300 represents any suitable computing device, such as a laptop, mobile device, desktop, or the like.

The operating system 330 includes the shell 318, the kernel 316, and the server 320. The operating system 300 manages computer hardware, memory, applications or other software. The operating system 300 acts as the interface between computer hardware components and the user. Examples of the operating system 300 include MICROSOFT WINDOWS operating systems (e.g., WINDOWS 11, WINDOWS 10), Apple macOS (e.g., KODIAK, LION, MAVERICKS), and GOOGLE's Android OS, LINUX Operating System, and Apple iOS.

The operating system shell 318 (also referred to herein as "shell 318") is the outermost layer of the operating system 330 and is the user interface (e.g., a graphical user interface or command line interface) that exposes the operating system 330 services to a user or other program. For example, the shell 318 can include a task bar, a desktop, icons within the task bar, or pop-up windows used for surfacing different applications, and the like. The shell 318 incorporates a programming language to control processes and files, as well as start and control other programs based on user input. The shell 318 manages the interaction between a user and the operating system 330 (or the kernel 316 actions) prompting users for input, interpreting that input for the operating system 330, and then handling any resulting output from the operating system 330.

The kernel 316 is the core of the operating system 330 that manages computer hardware and software, such as disk management, task management, memory management, and the like. The kernel 316 decides which processes are allocated to one or more processors to execute and which processes should be kept in main memory to execute so as to act as an interface between the client application 340 (and other applications) and hardware. Accordingly, the kernel 316 manages communications between user-level applications and hardware. In some embodiments, the kernel 316 establishes a connection between the client application 340 and hardware (main memory, cache, processor registers) so as to allocate incoming requests from the client application 340 (or the server 320).

The client application 340 is any suitable application that supports content sharing capabilities. In some embodiments, the client application 340 is configured to facilitate electronic communication (e.g., audio-visual web exchange) between a plurality of users. Examples of such client applications include MICROSOFT TEAMS, ZOOM, FACEBOOK MESSENGER, or the like.

The server 320 and the client 342 are components of an API (or are individual APIs). The server 320 is a server side of the API and the client 342 is the client side of the API. The server 320 includes the connection listener 302, the mouseover detector 304, the content sharing requestor 306, the content sharing confirmator 310, and the content sharing stop requestor 314. The client 342 includes the connection caller 344, the window handle producer 346, the content sharing producer 348, the report change module 350, and the content sharing stopper 352.

At a first time, when the operating system 330 initiates (e.g., via a start-up bootstrapping process), the server 320 is activated and the connection listener 302 specifically listens for any client connection requests. The connection caller 344 issues a connection request to the connection listener 302. In some embodiments, in response to detecting that a meeting or-communication session has started within the client application 340, the client application 340 consumes the client 342, and specifically the connection caller 344 sends the connection request to the connection listener 302.

In some embodiments, the client application 340 consumes the client 342 via a "ShareWindowCommandSource Class" component (hereinafter referred to as the "share window component"). This share window component represents an object that the client application 340 uses to set up communication with the shell 318 (or more specifically the server 320) to present UI for starting and stopping application window sharing. This API enables communications applications to be the source of application window sharing commands that will be presented in the shell 318 in the taskbar previous flyout window or other operating system component. When the client application 340 is being used for a communication session or meeting, the client application 340 can set up communication with the shell 318 by obtaining the share window component and calling a Start( ) function thereafter. Specifically, when a communication session or meeting starts, the client application 340 calls the Start( ) function. Such Start( ) function indicates that the client application 340 is currently a source of application window sharing command. The Start( ) function also serves as a connection request such that the connection listener 302 that is listening receives the connection request from the connection caller 344 and establishes a connection with the client 342. It is understood that "establishing" a connection can occur when the connection listener 302 receives the connection request from the connection caller 344 and/or when the connection caller 344 sends such connection request.

Subsequent to the connection being established between the operating system shell 318 and the client application 340, the mouseover detector 304 detects a mouseover or hover box event to detect that a graphical control element within a data object has been activated based on a user moving or hovering a pointer over a trigger area of the graphical control element. For example, the mouseover detector 304 can detect when a mouse pointer hovers over an icon representing an application window within a task bar. In some embodiments, in response to such detection, the mouseover detector 304 makes a call 360 to the window handle producer 346 to get the command for the particular content item (e.g., an application window). In some embodiments, such call is a "GetForCurrentView" method in order to obtain an instance of the share window component. Accordingly, the mouseover detector 304 requests a window handle or other data object ID from the window handle producer 346. A "widow handle" (e.g., HWND) refers to a pointer (e.g., IntPtr) with one or more values to point to window-structure data (e.g., a thumbnail) or an application window. Accordingly, a window handle can include a thumbnail or other particular view of a particular application window.

In existing solutions, communications applications typically populate such IDs, which is how these client applications show available application windows. However, in these embodiments, the server 320 of the shell 318 requests these window handles from the client 342. In effect, the shell 318 is requesting from the client application 340 a state it wants to show for the application window. In these embodiments, the server 320 is not maintaining such state—in response to flyout windows or other operating system components surfacing, the server 320 asks the client 342 what state the client 342 wants the server 320 to show to the user.

The window handle producer 346 responsively sends 362 the window ID (or other content item ID) back to the mouseover detector 304. For example, the window handle producer 346 can send a window handle that includes a particular thumbnail that the flyout window is to contain. In some embodiments, 362 represents a "CommandRequested" event in the share window component. CommandRequested is an event that is raised by the shell 318 to give the client application 340 an opportunity to support starting or stopping sharing a particular application window. The idea is that the client application 340 knows what is being shared or not shared, but the operating system 330 is unaware of such state.

In some embodiments, in response to receiving an indication that a connection has been established between the client 342 and server 320, the mouseover detector 304 calls the content sharing requestor 306 in order to produce a flyout window and/or other user interface element, such as a "share this window" button. In some embodiments, in response to receiving the window ID via 362, such flyout window or other operating system component (such as a task switcher) presents the application window within the flyout window, as a thumbnail or other representation of the content item (according to how the client wishes this to be presented).

In some embodiments, in response to receiving an indication of a user selection of the "share this window" button within the flyout window, the content sharing requester 306 calls the content sharing confirmator 310 in order to produce a button and/or other user interface element (e.g., within the flyout window) that is user selectable and acts as a confirmation mechanism to confirm that the user wishes to share the content item. In other words, a selection of the "share this window" button does not automatically cause a sharing of the application window. Rather, another process within the shell 318 is called so as to surface a confirmation message and selectable user interface element so that the user is required to confirm such requested sharing. For example, the user may accidentally select the "share this window" button. Accordingly, the user may select a button indicating that they do not want to share the application window.

In response to receiving an indication that a user has selected the confirmation button or other user interface element, the content sharing confirmator 310 sends a command to the content sharing producer 348 at the client 342 to cause the requested application window (or other content item) to be produced to the plurality of user devices. For example, in a share window component context, the content sharing confirmator 310 sends a "CommandInvoked" command to tell the client 342 that the user has clicked the flyout window (or other operating system component) button. The "CommandInvoked" command is an event that is raised by the shell 318 to give the client application 340 an opportunity to start or stop sharing a particular application window. In some embodiments, such command sent by the content sharing confirmator 310 includes the window ID (or other content item ID) but the content sharing confirmator 310 does not receive any message back. Responsively, the content sharing producer 348 shares the content.

In response to the content sharing producer 348 sharing the content, this component calls the report change module 350 in order to report a change (a start of content sharing) back to the server 320. In some embodiments, such changes to report include any time content starts to be shared, is stopped (no longer being shared), or none (there is no content being shared). For example, in the context of the share window component, any time there is a change, the content sharing producer 348 or the content sharing stopper 352 calls the "ReportCommandChanged( )" function in order to identify what state has been changed. The "ReportCommandChanged( )" function indicates, to the shell 318, that the sharing state of the client application 340 has changed. This method is called whenever the client application 340's sharing state has changed. The shell 318 then flushes any information it has received as part of any "ShareWindowCommandSource.CommandRequested" event, and will update its visible share commands to match the current state of the client application 340. Such reporting of changes may be important so that the kernel 316 keeps requests (current states) in cache up and until the shell 318 receives a report command change (e.g., "ReportCommandChanged( )"), at which point the kernel 316 clears the cache. The reason the kernel 316 maintains the cache is that normally, when a user engages in a mouseover event to hover over an application window and a flyout window is produced, any time the user moves the pointer over the flyout window, cross process calls will be repeatedly made between client 342 and server 320. But keeping requests in cache keeps this from happening.

In response to receiving an indication that the user has selected a stop sharing button within the flyout window (or other operating system component), the content sharing stop requester 314 sends a command (e.g., a "CommandInvoked" command) to the content sharing stopper 352 so that the client application 340 can then stop sharing content. The content sharing stopper 352 additionally calls the report change module 350 in order to report such change back to the server 320 of the shell 318.

Figure 4A:
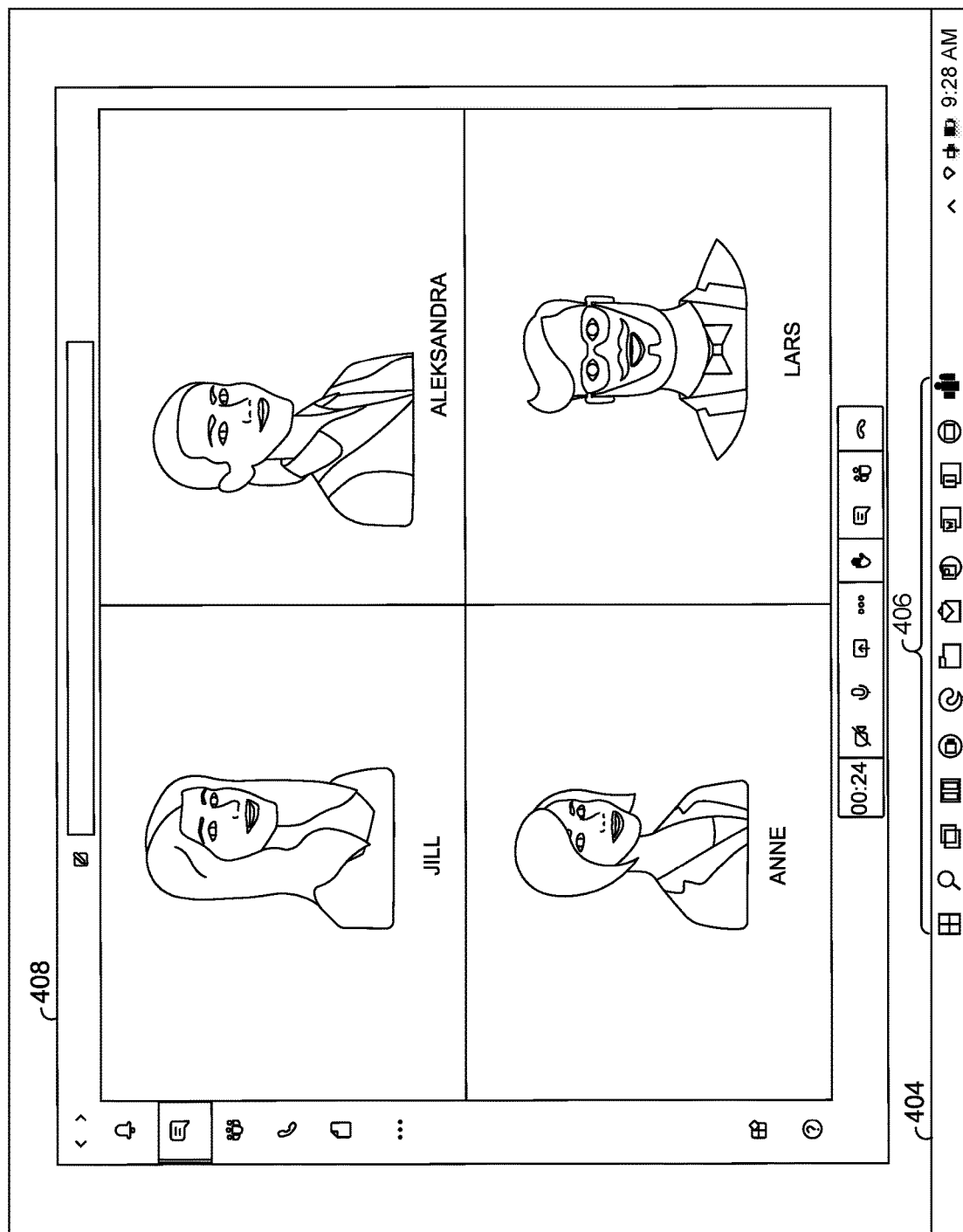
FIG. 4A is a screenshot of an example user interface illustrating a connection being established been a client application and an operating system prior to any user engagement of an icon within a taskbar, according to some embodiments.

FIG. 4A through FIG. 4D are screenshots of example user interfaces that illustrate a step-by-step process for sharing a particular content item via communications between a client application and an operating system, according to some embodiments. FIG. 4A is a screenshot 400 of an example user interface illustrating a connection established between a client application and an operating system prior to any user engagement to share content, according to some embodiments. The screenshot 400 includes a desktop 402, a taskbar 404, and a client application window 408 of a client application. A desktop is a primary screen area displayed to a user after the user turns on a computer and an operating system is loaded via a bootstrap process. A desktop may include an operating system user interface component that includes icons corresponding to different files, folders, and may further include the taskbar 404. The taskbar 404 includes a plurality of icons 406, each of which represents a corresponding application and/or content item, such as an application window. The client application window 408 is a separate user interface that represents a particular routine, application page, or component of a communications client application, where the client application includes a plurality of different routines, application pages, or components.

In some embodiments, a connection is established between a client application and an operating system in response to a communication session of a client application being initiated for any participant that joins a meeting or communication session. For example, the screenshot 400 may represents Lars' computing device. In response to receiving an indication that Lars joined the meeting (by receiving an indication that Lars selected a meeting link) and/or an instance of the client application window 408 being produced, a connection is established as described with respect to the connection caller 344, the connection listener 302, and/or the connection module(s) 202 of FIG. 3 and FIG. 2 respectively. Such connection may be established between each of the other users' (e.g., Anne, Aleksandra, and the like) client application and operating system so that each user can share content via interface with operating system components, as described herein.

In some embodiments, prior to the connection being established between the operating system and a client application or a rendering of an instance of the client application window 408, user engagement of any of the icons 406 is set to default functionality according to the particular operating system. Accordingly, in response to receiving an indication, for example, that a pointer has hovered over the icon 406-1 (via user movement), the operating system shell causes one or more thumbnails of the icon to be displayed, each of which is a miniature or smaller representation of an application window or application page and includes a live preview of the content currently displayed in the application window or application page. However, no flyout windows or other operating system user interface elements are produced for sharing content at this point. An "icon" within the taskbar is a data object corresponding to a particular application. When a mouse pointer hovers over such icon, the operating system shell produces each application window (or thumbnail of the application window) or other content item the user has open belonging to the specific application. For example, a user may currently have open 4 WORD documents. However, only 1 application icon may represent all 4 WORD documents within the taskbar. However, when the operating system shell detects a mouse pointer hovering over the icon, a thumbnail for each of the 4 WORD documents is displayed. In some embodiments, the existence of an icon or other data object within an operating system component (e.g., a taskbar) means that the user presently has a content item open. In other words, the content item is running in the foreground or background.

Before a communication session or meeting starts, some embodiments of the present techniques automatically close out of or open specific content items at the task bar (or other operating system component) or corresponding icon based on the communication session, meeting, and/or user context so that only relevant content items and corresponding data objects are included in a task bar (or other operating system component) for the specific meeting. In this way, there is less clutter and fewer icons that the user must engage in during the communication session or meeting to find the correct content item to share. Communication sessions or meeting context can include what is known about the communication session or meeting, such as the time the communication session or meeting starts, the topic of the communication session or meeting, files shared in an email invite to the communication session or meeting, emails or chats of content to be discussed in the communication session or meeting, and/or the like. User context can include what is known about a user, such as the user's company role, past content items that have been used for the same type of communication session or meeting or any communication session or meeting, and the like. Some embodiments use one or more machine learning models (such as a neural network) to concatenate and encode some or all of the communication session or meeting and user context into a feature vector in order to train on and predict which content items or corresponding data objects to produce at the task bar (or other operating system component) before a communication session or meeting. For example, at a predetermined time before the communication session or meeting (e.g., 5 minutes prior), some embodiments automatically add the application window and specific icon of a first file at the task bar based on the application window corresponding to a file that was shared in a communication session or meeting invite for the meeting or communication session and/or based on the application window having been previously shared in a communication session or meeting with the same topic or title.

In some embodiments, prior to one or more application windows or applications being automatically closed before a communication session as described above, some embodiments first cause a notification and confirmation button(s) to be displayed to a user device. Such notification may indicate that one or more particular application windows are candidates to be closed. A user selection of such confirmation button(s) causes the closing of the candidates, thereby allowing a user to confirm the closing of the candidates. In some embodiments, there are a plurality of selectable confirmation buttons, each corresponding to a respective application window that is a candidate for closing so that the user can manually close out each application window individually. Alternatively, there is a single selectable confirmation button so that in response to receiving an indication of selection, particular embodiments cause the candidates to be automatically closed altogether or simultaneously.

Figure 4B:
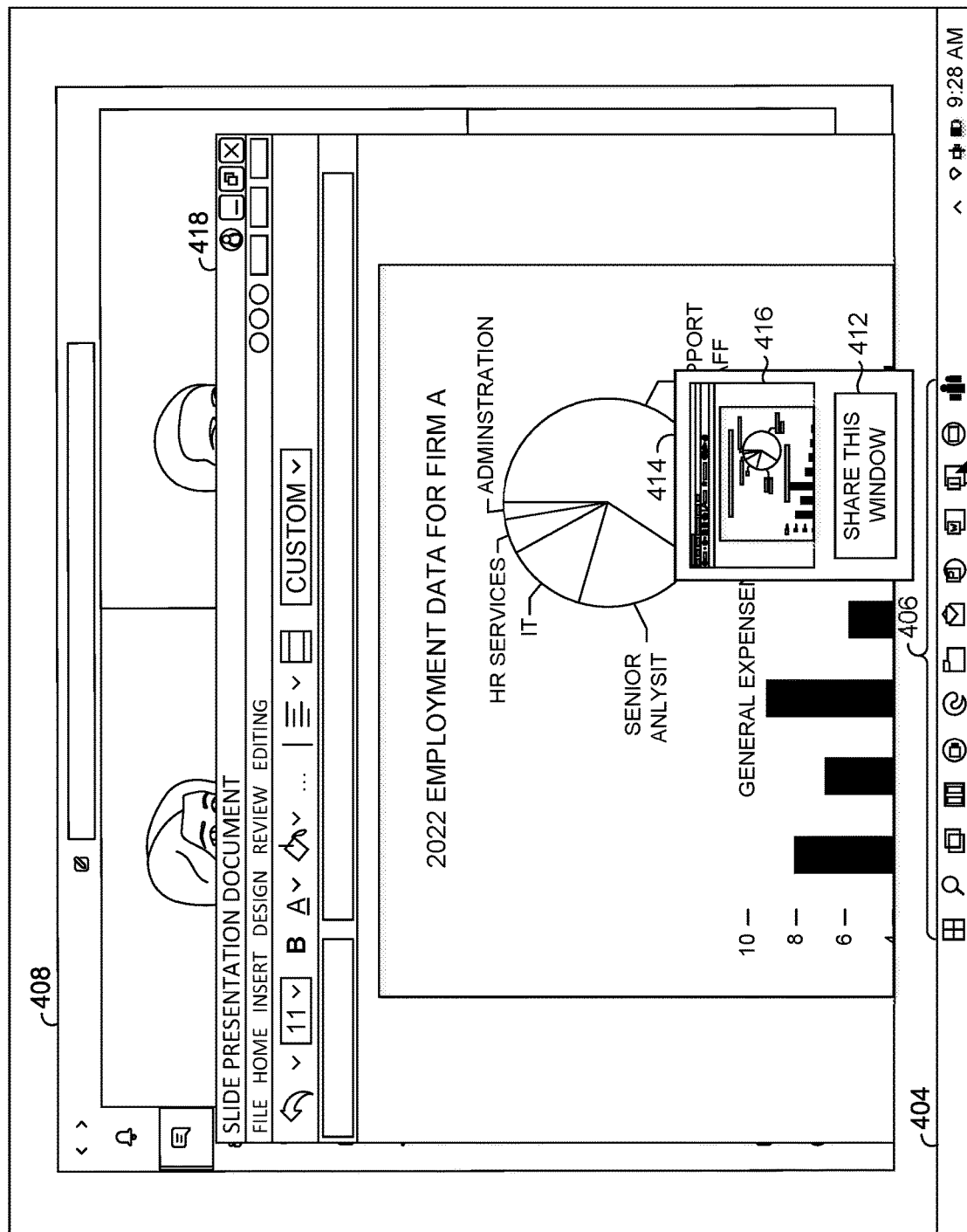
FIG. 4B is a screenshot of an example user interface indicating user engagement of a data object at a time subsequent to the screenshot of FIG. 4A and after a connection has been established between an operating system and client application, according to some embodiments.

FIG. 4B is a screenshot 400-1 of an example user interface indicating user engagement of a data object at a time subsequent to the screenshot 400 of FIG. 4A and after a connection has been established between an operating system and client application, according to some embodiments. FIG. 4B specifically illustrates that after a connection has been made, in response to detecting a pointer 410 hovering over the icon 406-2, a flyout window 414 is produced. The flyout window 414 includes a thumbnail 416 and a "share this window" button 412.

In some embodiments, other user interface elements may be presented in addition or alternatively to the thumbnail 416 or the "share this window" button 412 such that any suitable UI affordance corresponding to desired communications applications commands (e.g., share window) is displayed in association with the request to share content In other words, once a communication application establishes a connection with the shell, the communication application may communicate particular UI affordances corresponding to available application commands that are to be produced at the flyout window 414. For example, instead of the communication application communicating, to the shell, a command to display the thumbnail 416, the communication application can simply communicate, to the shell, a command to display a name of the application window. Alternatively or additionally, instead of the "share this window" button 412, "share" and "cancel" buttons can be produced similar to FIG. 4C.

In some embodiments, such detection of the pointer 410 hovering over the icon 406-2 occurs as described with respect to the user engagement detector 204 of FIG. 2 or the mouseover detector 304 of FIG. 3. In some embodiments, such production of the flyout window 414 occurs as described with respect to the content sharing module(s) 206 of FIG. 2 or the content sharing requestor 306 of FIG. 3.

FIG. 4B also illustrates the application window 418, which represents a component, application page, routine, or point of another application relative to the client application window 408 or the desktop 400. Such application window 418 may represent a currently opened application window that the user currently wishes to share. In some embodiments, the application of the application window 418 is stored locally to a user device, and/or the communications application corresponding to client application window 408 is locally stored to the same user device.

Figure 4C:
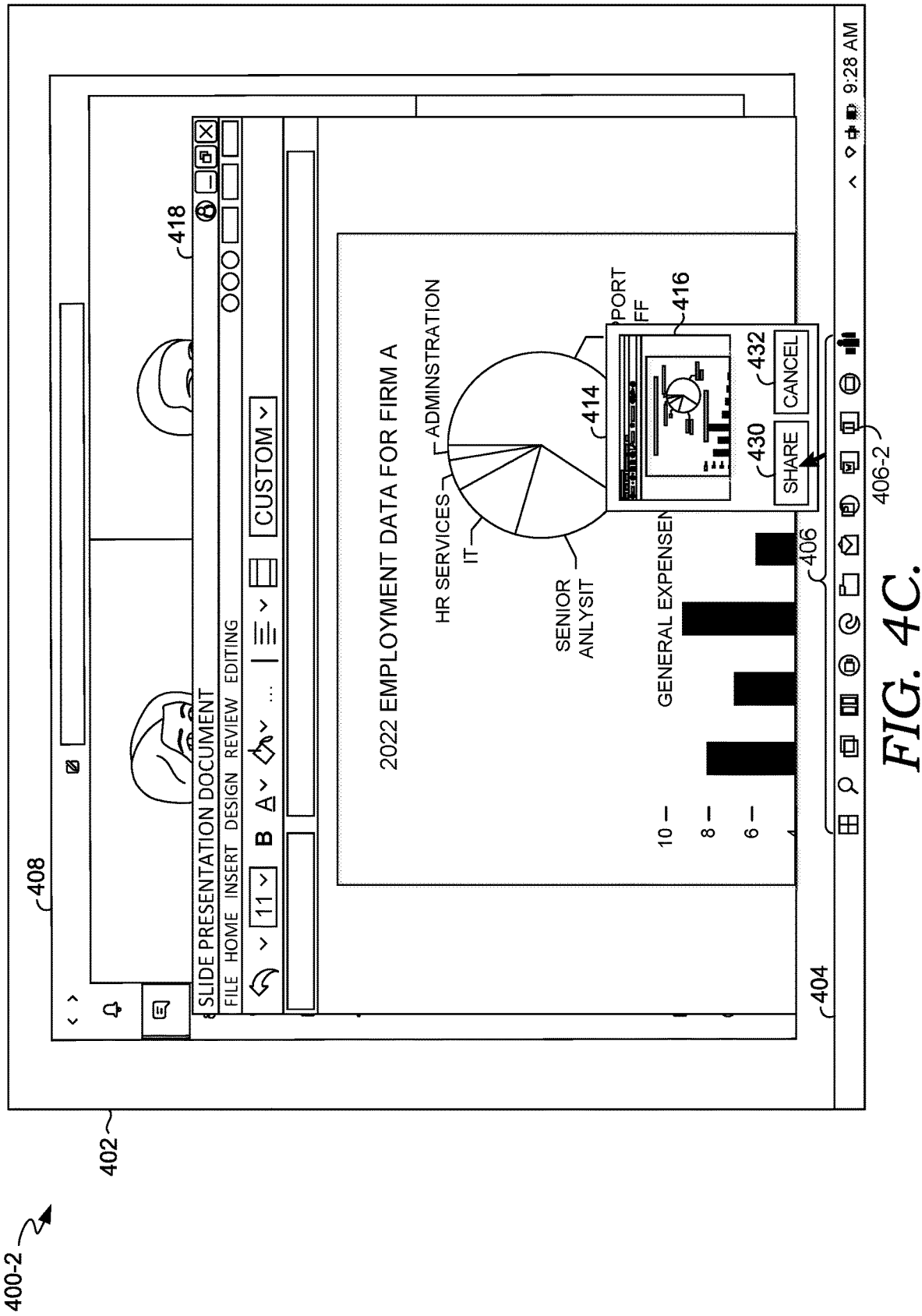
FIG. 4C is a screenshot of an example user interface indicating a confirmation of whether the user wants to share content in response to a selection of the "share window button" of FIG. 4B, according to some embodiments.

In some embodiments, a user selection of the "share this window" button 412 directly causes a sharing of the application window to the other participants of the communication session or meeting. In alternative embodiments, and as described in more detail below with respect to FIG. 4C, in response to receiving an indication that the "share this window" button 412 has been selected, a confirmation button is caused to be produced so that the user can confirm that they indeed want to share the item. In yet other embodiments, there is no production of the flyout window 414. Rather, some embodiments require an explicit user selection (e.g., a mouse click or touch gesture) or other user engagement of the icon 406-2. In these embodiments, there is exception logic built into the operating system based on the connection being established between the operating system and underlying client application. For example, normally a user selection or other user engagement of the icon 406-2 causes one or more application windows to be expanded or displayed to the user's screen, similar to application window 418. However, when a meeting or communication session starts or there is otherwise a connection established between operating system and client application, there is an override in program rules that causes a direct sharing of the corresponding content item alternative to or in addition to causing the expanded application window to appear. This acts as a one-click (or fewer-click) solution to share content items so as to reduce user input, navigation, and therefore I/O even more. For example, with respect to a one-click solution where an icon represents a single application window, in response to receiving an indication of a user click of the icon 406-2, the operating system sends a command of the corresponding application window ID to the client application so that the client application can cause a sharing of the application window or application page corresponding to such window ID to a plurality of user devices associated with different participants of a meeting or communication session. In some instances, however, a single icon represents multiple application windows, which means that there may be additional user engagement that is required to perform the same functionality. For example, in response to receiving an indication that a pointer has hovered over (or the user has otherwise selected) an icon at the task bar, the shell may produce two thumbnails representative of two application windows. Thus the user may select which of the two applications the user wishes to share. Accordingly, in response to receiving an indication of a user click of one of the thumbnails, the operating system sends a command of the corresponding application window ID to the client application so that the client application can cause a sharing of the window or application page corresponding to such application window ID to the plurality of user devices FIG. 4C is a screenshot 400-3 of an example user interface indicating a confirmation of whether the user wants to share content in response to a selection of the "share window button" 412 of FIG. 4B, according to some embodiments. In response to receiving an indication that the user has selected the "share window button" 412 of FIG. 4B, particular embodiments cause presentation of the "share" button 430 and the "cancel" button 432 within the already-produced flyout window 414 and additionally cause removal of the "share window" button 412 of FIG. 4B.

In response to receiving an indication that the user has selected the "share" button 430, particular embodiments cause (e.g., via the operating system sending a command to a client application) the corresponding content item to be presented to a plurality of user devices. In other words, the application window 418 is caused to not only be presented to the user device that displays the screenshot 400-3, but the application window 418 is caused to be presented to one or more other user devices of other users that are part of the same meeting or communication session (and no other part of the user's screen, such as the desktop 402 or the taskbar 404 is caused to be displayed, but only the application window 418 corresponding to the application window icon 406-2).

In response to receiving an indication that the user has selected the "cancel" button 432, particular embodiments selectively refrain from causing the corresponding content item to be presented to the plurality of user devices. In some instances, users may accidentally select the "share this window" button 412 and the true intent of the user is to not share the application window 418. Accordingly, particular embodiments can refrain from sharing content in response to receiving confirmation that the user in fact does not intend to share any content.

In some embodiments, the production of the "share" button 430 and the "cancel" button 432 and the functionality performed thereafter occurs via the content sharing confirmator 210 of FIG. 2, the content sharing confirmator 310, and/or the content sharing producer 348 as described with respect to FIG. 3.

Figure 4D:
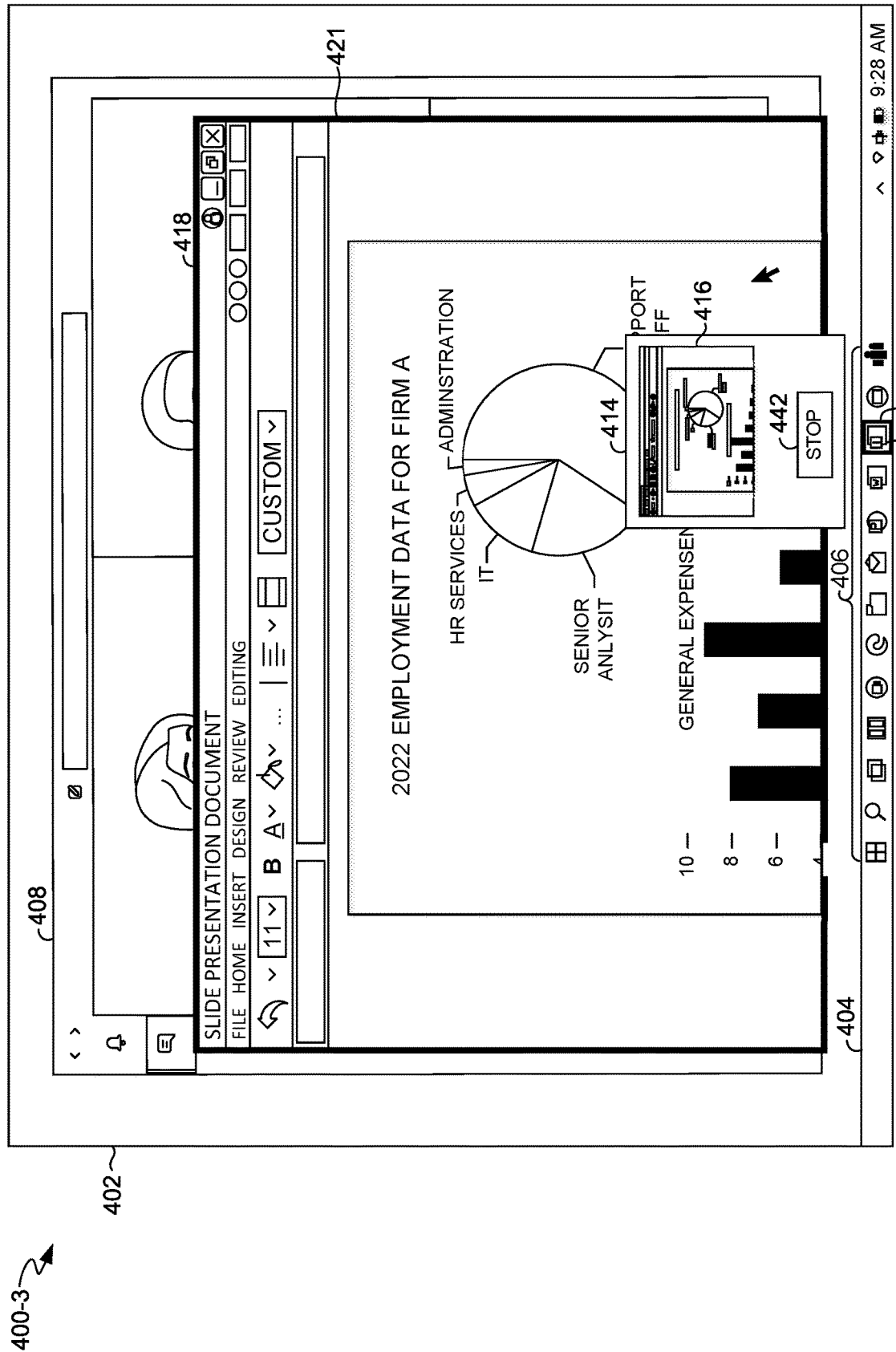
FIG. 4D is a screenshot of an example user interface indicating a stoppage of sharing content in response to a selection of the "share" button of FIG. 4C, according to some embodiments.

FIG. 4D is a screenshot 400-4 of an example user interface indicating a stoppage of sharing content in response to a selection of the "share" button 430 of FIG. 4C, according to some embodiments. In response to receiving an indication that the user has selected the "share" button 430 of FIG. 4C, particular embodiments cause presentation of the "stop" button 440 within the already-produced flyout window 414 and additionally cause removal of the "share" button 430 and "cancel" button 432 of FIG. 4C. The "stop" button 430 is a selectable button configured to stop the sharing of content upon its selection. In some embodiments, in response to receiving the indication that the user has selected the "share" button 430 of FIG. 4C, particular embodiments additionally or alternatively automatically cause presentation of the highlight indicia 420 (e.g., a red border) around the icon 406-2, indicating that the corresponding content item is currently being shared. In some embodiments, such highlighting is performed as described with respect to the content sharing real-time indicator 208 of FIG. 2. Additionally or alternatively, in response to receiving the indication that the user has selected the "share" button 430 of FIG. 4C, particular embodiments automatically cause presentation of the highlight indicia 421 (e.g., another red border) around the application window 418, which also indicates the particular application window or content item is currently being shared.

In response to receiving an indication that the user has selected the "stop" button 440, particular embodiments cause (e.g., via the operating system sending a commend to a client application) the corresponding content item to not be presented to the user devices any longer. In other words, the sharing of application window 418 to other user devices of other users that are part of the same meeting or communication session is stopped such that only the sharing user's device includes the application window 418 and no other user. In some embodiments, in response to receiving an indication that the user has selected the "stop" button 440, the indicator 420 and/or 421 is removed around the icon 406-2 and/or application window 418, which indicates that the corresponding content item is no longer currently being shared.

In some embodiments, the production of the "stop" button 440 and the functionality performed thereafter occurs via the content sharing stop module(s) 214 of FIG. 2, the content sharing stop requestor 314, and/or the content sharing stopper 352 as described with respect to FIG. 3. In some embodiments, the production or display of the "stop" button 440 occurs in response to receiving another indication that the cursor 410 is once again hovering over the icon 406-2. In other embodiments, the "stop" button 440 is automatically caused to be presented in response to receiving an indication that the corresponding content is currently being shared.

Figure 5:
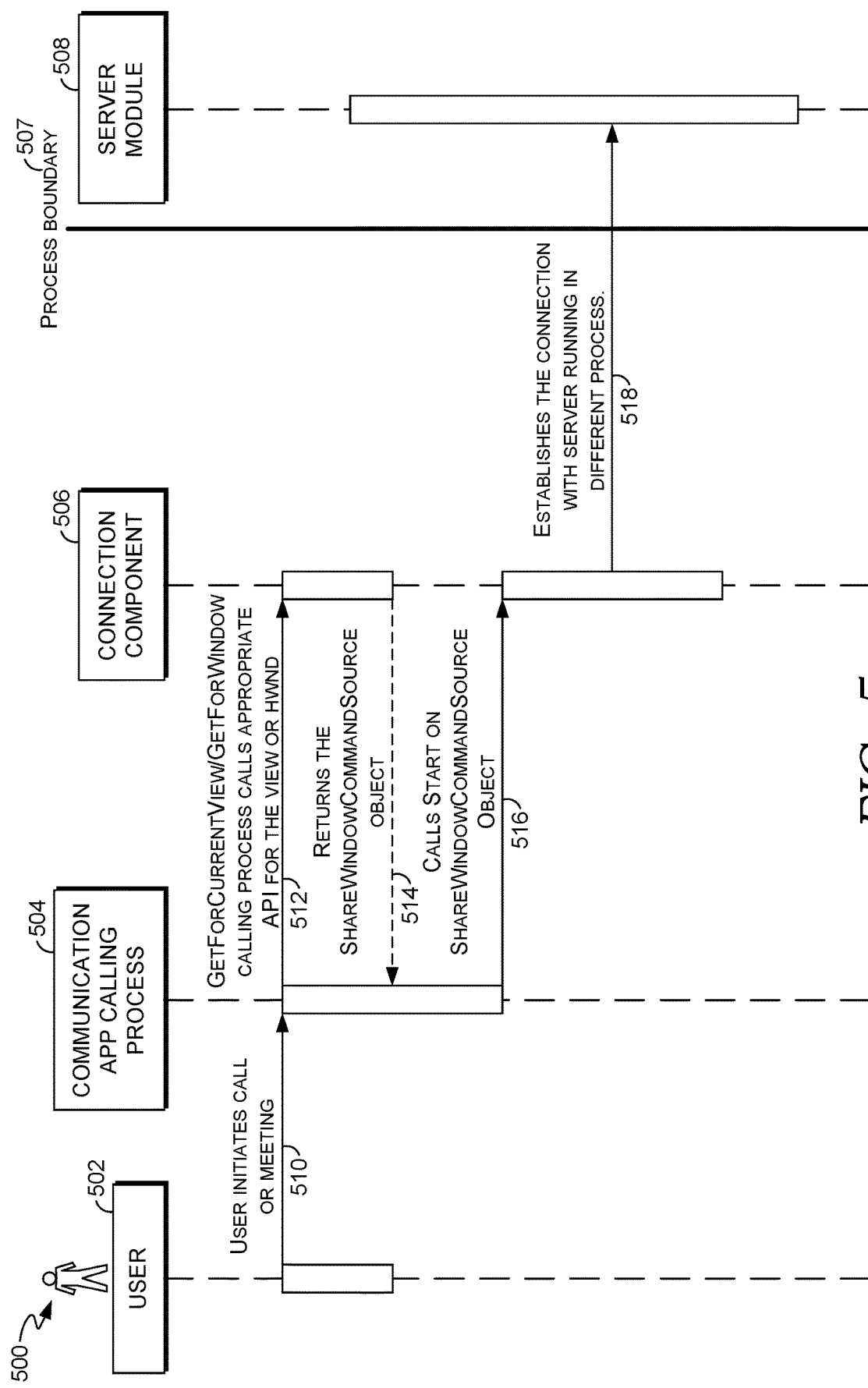
FIG. 5 is a sequence diagram illustrating how a connection is established between an operating system and a client application in preparation for content sharing, according to some embodiments.

FIG. 5 is a sequence diagram 500 illustrating how a connection is established between an operating system and a client application in preparation for content sharing, according to some embodiments. In some embodiments, the sequence diagram 500 represents the functionality as described with respect to the connection module(s) 202 of FIG. 2, the connection caller 344, and/or the connection listener 302 of FIG. 3. In some embodiments, the server module 508 represents the server 320 of FIG. 3. In some embodiments, the connection component 506 and the communication app calling process 504 are included in the client application 340. In some embodiments, the connection component 506 specifically includes the functionality of or represents the connection caller 344 of FIG. 3.

At a first time, the communication app calling process 504 receives an indication 510 that the user 502 has initiated a communication session or meeting. Responsively, based on receiving the indication 510, the communication app calling process 504 calls, via 512, the corresponding API for the appropriate view or window handle. For example, as described herein, the communication app calling process 504 can issue a "GetForCurrentView" or "GetForWindow" call to the connection component 506. In some embodiments, such call is made on a thread that is pumping messages. The window handle provides the name of the application and the brand icon of the application, which corresponds to the specific icon (e.g., in a taskbar) and the specific application window content item. All calls from the returned object, such as via 514, should be made on this thread. In some embodiments, such object is singeleton to the view/hwnd it is created for.

The connection component 506 responsively returns, via 514, the window handle back to the communication app calling process 504. Responsively, the communication app calling process 504 calls the "start( )" function on the ShareWindowCommandSource object. As described herein, such function indicates that the calling application is currently a source of application window sharing commands. Such methods are typically called during a meeting or other communications application communication session to enable the communications application to be a source of application window sharing commands. Responsively, the connection component 506 makes a cross process call, over the process boundary 507, to the server 508, to establish a connection between the server 508 and the connection component 506, or more generally, an operating system and client application.

In some embodiments, the process boundary 507 represents the logical boundary between a client application and an operating system on the same or different host devices. For example, the communication app calling process 504 and the connection component 506 can be included in a client application, such as a communication application, and the server 508 can be included in an operating system all within the same host device.

Figure 6:
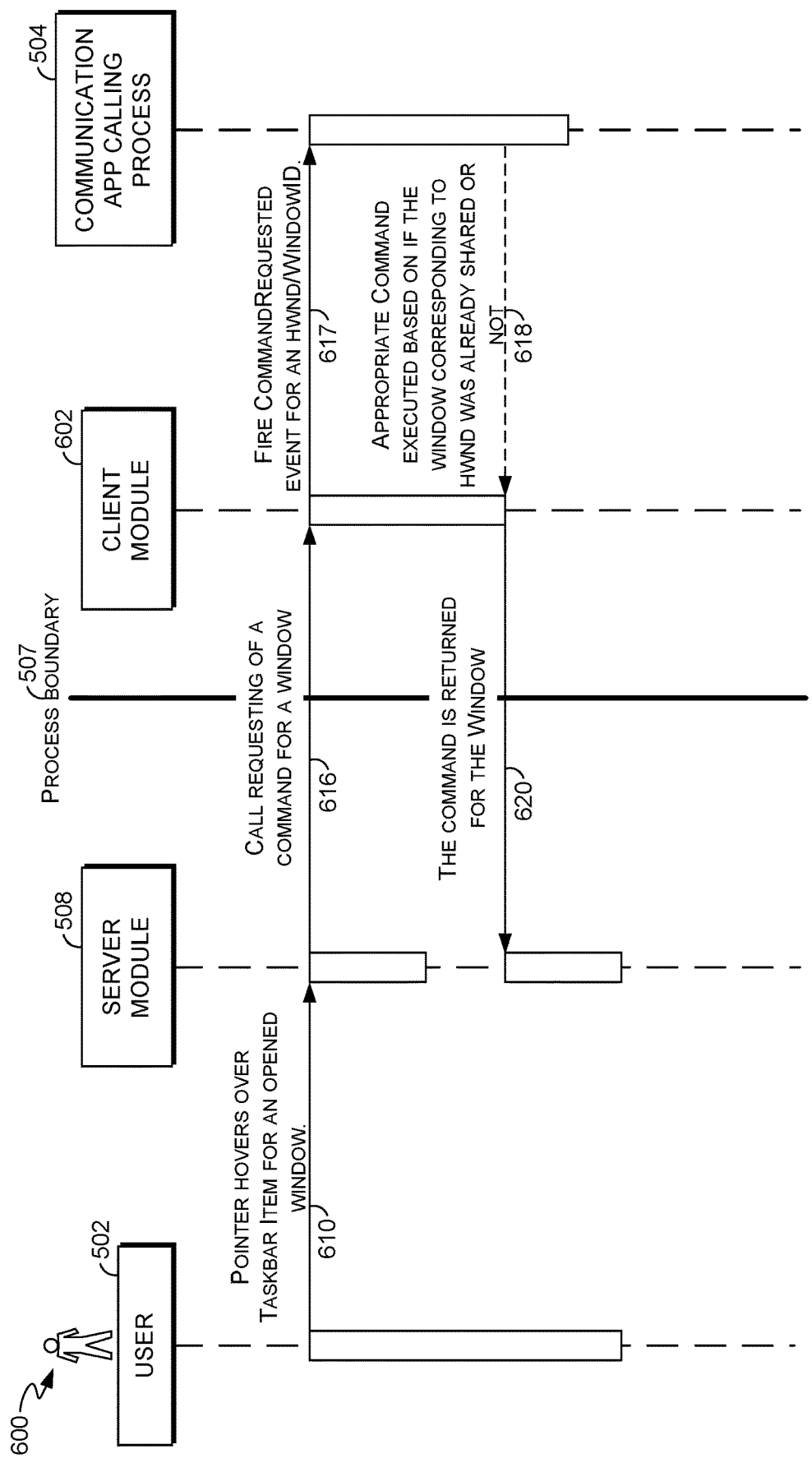
FIG. 6 is a sequence diagram illustrating the communication between the operating system and client application after a connection has been established via the sequence diagram of FIG. 5 and based on a cursor hovering over a data object within the taskbar, according to some embodiments.

FIG. 6 is a sequence diagram 600 illustrating the communication between the operating system and client application after a connection has been established via the sequence diagram 500 of FIG. 5 and based on a cursor hovering over a data object within the taskbar, according to some embodiments. In some embodiments, the sequence diagram 600 represents the functionality as described with respect to the user engagement detector 204 of FIG. 2, the mouseover detector 304, the window handle producer 346, and/or the content sharing requester 306 of FIG. 3. More generally, in some embodiments, the client module 602 includes the functionality of or represents the client 342 of FIG. 3 and the server module 508 includes the functionality of or represents the server 320 of FIG. 3.

At a first time, the server module 505 receives an indication 610 that a pointer associated with user input of the user 502 has hovered over a particular icon corresponding to a particular application window in the taskbar. In response to receiving the indication 610, the server module 508 requests, via 616, (e.g., 360 of FIG. 3) a command for an application window (or other content item) from the client module 602 and waits for a return signal. For example, such request 616 can be a "GetForCurrentView" method, as described herein. Responsively, the client module 602 generates the command and sends, via 617, the command for a window handle or ID to the communication app calling process 504. Responsively, the communication app calling process 504 sends, via 618, a callback of the window ID or window handle to the client module 602 (e.g., via 362 of FIG. 3). Responsively, the client module 602 sends, via 620, the server module 508 a signal for command availability so that the window ID or handle gets produced (e.g., to a flyout window) when the taskbar is available or ready to show the window ID or handle. In some embodiments, user experience affordance is shown in a taskbar flyout window corresponding to the command, which corresponds to the application window being shared (or not shared).

Figure 7:
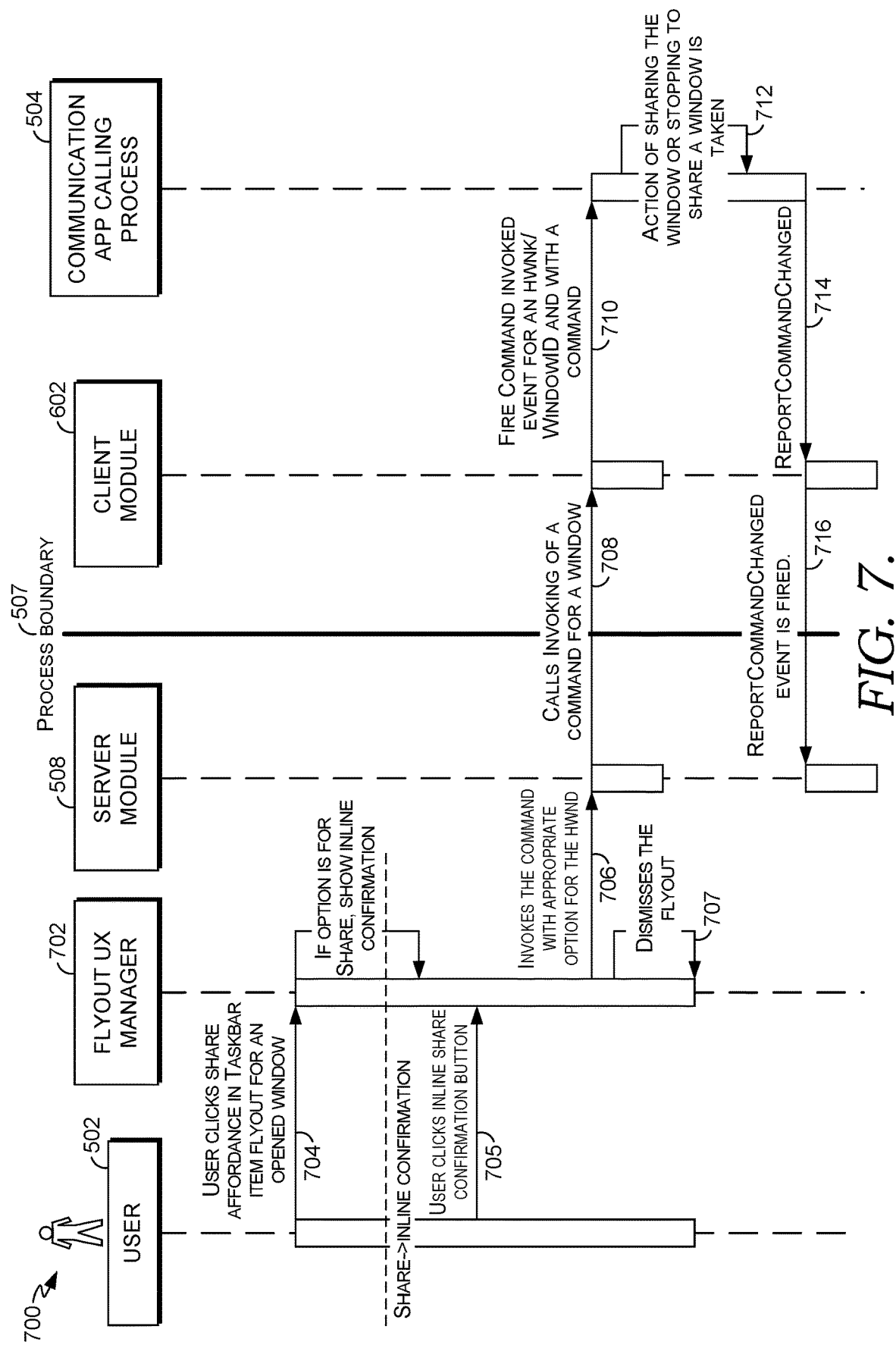
FIG. 7 is a sequence diagram illustrating communication between the operating system and client application in order to share or stop the sharing of content based on explicit user input, according to some embodiments.

FIG. 7 is a sequence diagram 700 illustrating communication between the operating system and client application in order to share or stop the sharing of content based on explicit user input, according to some embodiments. In some embodiments, the functionality of the process 700 occurs subsequent or responsive to the functionality as described with respect to the sequence diagram 500 of FIG. 5 and 600 of FIG. 6. In some embodiments, the sequence diagram 700 includes or represents the functionality as described with respect to the content sharing module(s) 206, the content sharing confirmator 210, the content sharing stop module(s) 214 of FIG. 2, the content sharing confirmator 310, the content sharing producer 348, the content sharing stop requestor 314, and/or the content sharing stopper 352 of FIG. 3.

At a first time, the FlyOut UX manger 702 receives an explicit "share" or "stop share" user input, indicative of a user request to share specific content or stop sharing specific content. If the option is to share (e.g., if the user selected the "share this window" button 412), the FlyOut UX manager 702 responsively generates and causes display of an inline confirmation button (e.g., the "share" button 430). Subsequently, the FlyOut UX manager 702 receives an indication that the user has clicked the inline confirmation button. Responsively, the FlyOut UX manager 702 sends a content share/stop request 706 to the server module 508. The server module 508 responsively calls invoking a command for an application window to the client module 602. For example, such request can be for a "CommandInvoked" command, as described herein. The client module 602 responsively engages, via 710, in the command invoked event for a window handle or ID and sends a corresponding command to the communication application calling process 504. Although each of the components in FIG. 7 "cause" the sharing of content, the communication app calling process 504 is directly responsible for producing content items via 712.

In response to 712, the communication app calling process 504 reports, via 714, the command change to the client module 602. In some embodiments such reporting of the command change includes or represents the functionality as described with respect to the report change module 350 of FIG. 3. As described herein, in some embodiments, reporting the command change is called by the communication app calling process 504 any time the state of what is being shared or not shared changes is triggered. For example, if the user 502 just uses a communication application's user interface to change what is being shared, the reporting command change function is called. At 716, the client module 602 responsively fires the report command change event back to the server module 508. In some instances, the user 502 dismisses the flyout window (e.g., clicks a "cancel" button). In this case, the FlyOut UX manager 702 receives such indication and dismisses the flyout 707 such that no further action is taken. In other words, in these instances, the steps 706, 708, 710, 712, 714, and 716 are not performed.

Figure 8:
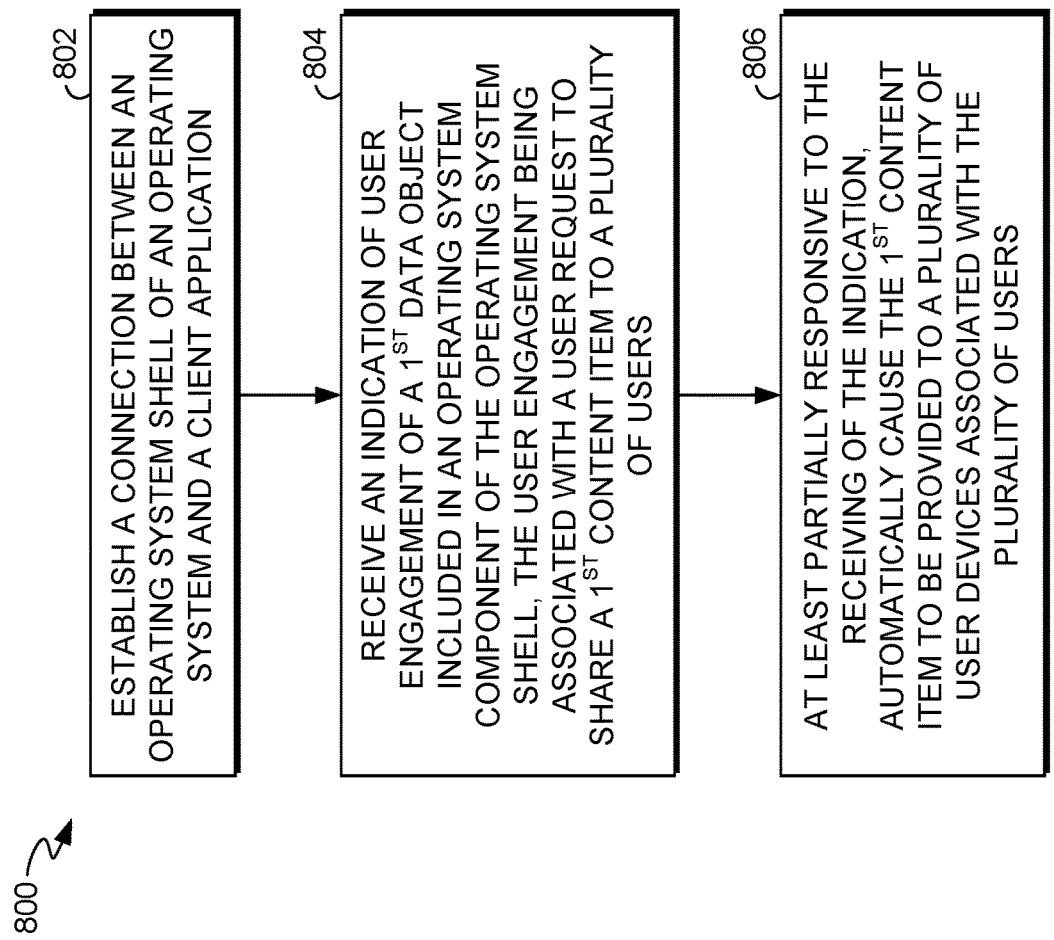
FIG. 8 is a flow diagram of an example process for sharing a content item via user engagement with an operating system component, according to some embodiments.

FIG. 8 is a flow diagram of an example process 800 for sharing a content item via user engagement with an operating system component, according to some embodiments. In some embodiments, the operating system 330 performs the process 800. In some embodiments, the client application 340 alternatively (or additionally) performs the process 800. The process 800 (and/or any of the functionality described herein) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIG. 1 through FIG. 13). The computer-implemented method, the system (that includes at least one computing device having at least one processor and at least one computer readable storage medium), and/or the computer readable medium as described herein may perform or be caused to perform the process 800 or any other functionality described herein.

Per block 800, particular embodiments establish a connection between an operating system shell of an operating system and a client application. In some embodiments, such establishment occurs via the functionality described with respect to the connection caller 344 and/or the connection listener 302 of FIG. 3. In some embodiments, such establishment occurs as described with respect to the connection module(s) 202 of FIG. 2 and/or the sequence diagram 500 of FIG. 5. In some embodiments, such client application (e.g., TEAMS) is configured to facilitate electronic communication between a plurality of users. For example, such electronic communication may be by way of audio-visual exchange between the users, where users can hear each other speak and see each other in near real-time. In these embodiments, users' utterances can be detected, via microphone, and transmitted over a network, and propagated over other user devices and emitted. Moreover, a camera included in the user's device can capture the real-world movements of the user, which is also transmitted over a network and propagated to the other user devices and emitted.

In some embodiments, the establishing of the connection at block 802 occurs in response to a specific event, such as receiving another indication that a meeting or communication session associated with the client application and the plurality of users has begun. In some embodiments, this includes functionality as described with respect to the connection module(s) 202 of FIG. 4A. For example, in response to receiving an indication that the client application window 408 has been produced for a participant using a user device that includes the client application and an operating system, such client application and the operating system can establish a connection so as to allow communication between operating system and client application for content sharing.

Per block 804, some embodiments receive an indication of a user engagement of a first data object included in an operating system component of the operating system shell, the first data object being associated with (e.g., representing) a first content item, the user engagement being associated with (e.g., being indicative of) a user request to share the first content item to a plurality of users. Such receiving of the indication may occur subsequent to the establishing of the connection per block 802. Examples of block 804 include the functionality as described with respect to FIG. 4B, where embodiments receive an indication that the cursor 410 has hovered over the data object 406-2. Alternatively or additionally, another example of block 804 occurs when embodiments receive an indication that the user has explicitly selected the "share this window button" 412.

An "indication" as described herein refers to a signal, message, a flag, a control value (e.g., a Boolean value, such as selection=TRUE). A "data object" as described to herein refers to a particular set of data that represents or is otherwise associated with a content item. For example, a data object can be an icon in a taskbar that represents an application of an application window, a thumbnail in a task switcher, a symbol, an identifier that includes natural language description of a content item, a button (or other user interface element) within a flyout window, or the like. An "operating system component" can be any suitable part of an operating system, such as a taskbar, a task switch component (also known as a "task switcher"), an operating system window (e.g., a flyout window), an operating system popup window, an operating system menu, a desktop, or the like. In some embodiments, such operating system component is any component included in an operating system shell.

In some embodiments, a "task switcher" is part of an operating system that switches the computer from one application (e.g., a first WORD document) to another (e.g., a second WORD document). Specifically, in response to specific user input, such as ALT+TAB, the operating system provides a thumbnail or miniature view of all open applications, where a successive selection of the TAB button (while ALT is still held down) causes a highlighting of a different thumbnail so that the user can select it for opening or sharing.

In some embodiments, a "content item" refers to any suitable content instance, such as an application window, application page, view, ANDROID activity, program flow point or other instance of an entire application or file. In this way, when a sharing of the content item occurs, only the sharing of the specific instance is shared of the entire application or file. For example, if a sharing user has a first application window open and corresponding natural language input of a WORD application and the "Home" tab has been selected an pinned, then a sharing of such application window would share the application window, the natural language input, and the "Home" tab contents, such as "cut," "copy," and "paste" indicia. In other words, the specific view or way a user sees content is exactly the way it is presented when it is shared. In some embodiments, such sharing does not include any write privileges by the receiving users of the share (only read privileges) such that they cannot write to, open, or otherwise engage with the content item; they can only view the content item in the manner the sharing user currently sees it.

In an illustrative example, and as described herein, in some embodiments, the first data object is an icon, among a plurality of icons, in a task bar component, where each icon represents a respective application window, of a plurality of application windows, and where the first content item represents a first application window, of the plurality of application windows. Examples of this include the functionality described with respect to the taskbar 404 that includes the icons 406 representing different corresponding application windows. An "application window" (or "window") as described herein, with respect to a taskbar, is an application page, view, or graphical control element of a particular application. Application windows can typically be exited out of (via selection of "X" indicia), minimized (via selection of a "–" indicia) so that it is not viewable at a desktop and only represented as an icon in a task bar, or maximized/made smaller so that a larger or smaller view is displayed at the desktop. Application windows typically represent a visual area or screen instance representing a portion of the graphical user interface of a particular application. An application window is typically generated when a user opens an application and the application window lasts until a user exits (e.g., selects the "X" indicia) out of the application window.

In some embodiments, prior to the receiving of the indication at block 804, some embodiments receive a second indication that a graphical control element included in the first data object has been activated based on a visual cursor hovering over the graphical control element without user selection of the graphical control element. And in response to the receiving of the second indication, particular embodiments cause presentation of a flyout window, where the flyout window includes a view (e.g., a thumbnail) of the first content item and a first user interface element. Examples of this are described with respect to FIG. 4B, where embodiments detect that the cursor 410 has hovered over the icon 406-2, and responsively the flyout window 414 is produced. Such "view" in this instance may correspond to 416 and such first user interface element may correspond to the "share this window" button 412. In some embodiments, such functionality includes the functionality as described with respect to the mouseover detector 304 and the window handle producer 346 of FIG. 3 and/or 610, 612, 614, 616, 618, 620, and/or 622 of FIG. 6.

In some embodiments, in response to receiving a third indication that the first user interface element has been selected, a second user interface element is caused to be presented. And some embodiments receive a fourth indication of a selection of the second user interface element, the selection of the second user interface element corresponds to a confirmation that a user wants to share the first content item and the selection of the second user interface element further corresponds to the causing of the first content item to be provided to the plurality of user devices. Examples of this are described with to FIG. 4C—in response to receiving an indication (the third indication) that the "share this window" button 412 has been selected, the "share" 430, and/or the "cancel" button 432 (the "second user interface element") is caused to be presented, where the "share" button 430 corresponds to a confirmation that the user wants to share the first content item. In some embodiments, such functionality includes the functionality as described with respect to the content sharing requestor 306, the content sharing confirmatory 310, the content sharing producer 348, and/or the report change module 350 of FIG. 3. In some embodiments, such functionality includes the functionality as described with respect to the explicit "share" user input 704, the request 706, of FIG. 7.

In some embodiments, at least partially in response to the receiving of the indication of the user engagement of the first data object at block 804, some embodiments cause an indicator to be displayed at the first data object, the indicator indicating that the first content item, among a plurality of content items, is the content item being shared to the plurality of users. In some embodiments, this functionality includes the functionality as described with respect to the content sharing real-time indicator 208 or the indicator 420 around the icon 406-2, as described with respect to FIG. 4B.

Continuing with FIG. 8, per block 806, some embodiments automatically cause the first content item to be provided to a plurality of user devices associated with the plurality of users at least partially responsive to the receiving of the indication at block 804. For example, as described with respect to FIG. 1, the content item 108 (e.g., an application page) can be shared to the user device 102a, 102b, and 102n. Examples of block 806 also includes causing a content item to be provided to user devices partially responsive to receiving indication that a cursor 410 has hovered over the icon 406-2 or partially responsive to receiving an indication that the user has selected the "share this window" button 412 of FIG. 4B. Other examples include causing a content item to be provided to user devices directly responsive to receiving an indication that the user has selected the "share" button 430 of FIG. 4C.

In response to the causing of the first content item to be provided to the plurality of user devices associated with the plurality of users at block 806, some embodiments automatically cause display of a first user interface element, where a selection of the first user interface element corresponds to a stopping of the sharing of the first content to the plurality of users. And in response to receiving another indication that the first user interface element has been selected, these embodiments refrain from causing the first content to be provided to the plurality of user devices. Examples of this are described with respect to receiving an indication that a user has selected the "stop" button 440 of FIG. 4D in order to stop the sharing of content. In some embodiments, such functionality includes the functionality as described with respect to the content sharing stop module(s) 214 of FIG. 2, and/or 704 and 706 of FIG. 7.

Some embodiments receive a second indication of user engagement of a second data object included in the operating system component of the operating system shell, where the second data object is associated with a second content item, and where the user engagement of the second data object being associated with a user request to share the second content item to the plurality of users via the client application. And in response to the receiving of the second indication, these embodiments automatically halt the sharing of the first content item and automatically cause the second content item to be provided to the plurality of user devices associated with the plurality of users. In some embodiments, such functionality includes the functionality as described with respect to the content sharing swap module(s) 212 in order to automatically swap out content for sharing without any other explicit "stop" selections. In some embodiments, user engagement of the second data object need not be included in the same operating system component of the same user device. Rather, a different non-sharing user may request to share the second content item while the requesting user is sharing the first content item. In these embodiments, the first content item is still automatically stopped or halted from being shared and the second content item is shared.

Some embodiments switch back to an operating system default mode when there is no longer a connection established per block 802 (or prior to such connection being established). In operation, some embodiments determine that the connection is no longer established between the operating system shell and the client application. Some embodiments further receive a second indication of user engagement of the first data object included in the operating system component and based on the connection no longer being established between the operating system shell and the client application and in response to the receiving of the second indication, these embodiments cause display, at a first user device, of the first content item, wherein the user engagement of the first data object no longer causes the first content item to be provided to the plurality of user devices. In an illustrative example, after there is no longer a connection established, in response to receiving an indication that the cursor 410 is hovering over the icon 406-2, the operating system causes presentation of a thumbnail of the corresponding content item, as opposed to the flyout window 414. In some embodiments, such default mode can be the default mode as described with respect to FIG. 4A before a connection has been established.

Figure 9:
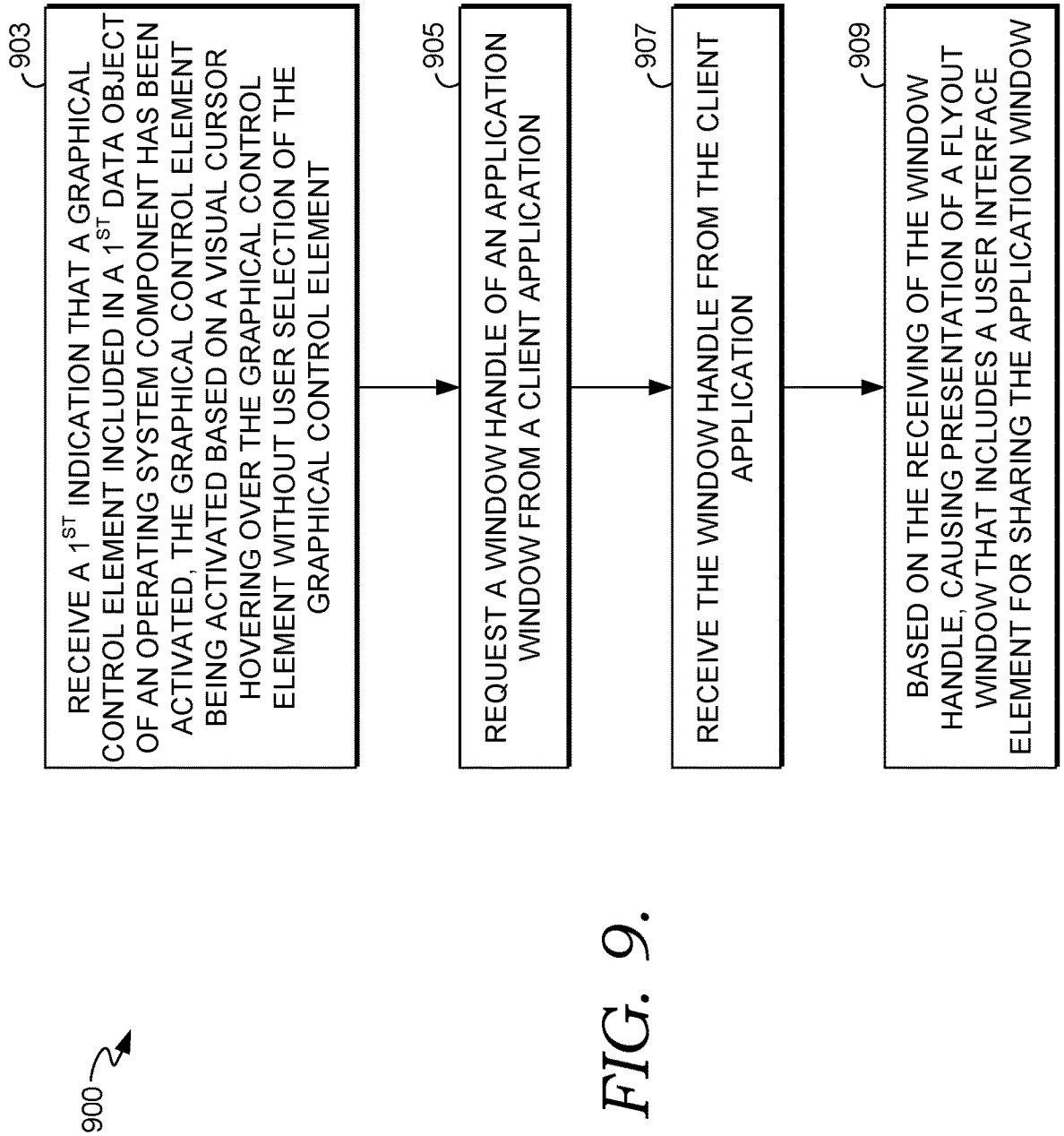
FIG. 9 is a flow diagram for an example process for producing a flyout window of an operating system component in order to share content, according to some embodiments.

FIG. 9 is a flow diagram for an example process 900 for producing a flyout window of an operating system in order to share content, according to some embodiments. In some embodiments, the process 900 is performed by the operating system 330 of FIG. 3. In some embodiments, functionality described with respect to FIG. 5 occurs before the process 900 and functionality with respect to FIG. 7 occurs after the process 900. Per block 903, some embodiments receive a first indication that a graphical control element included in a first data object (e.g., an icon) of an operating system component (e.g., a taskbar) has been activated, the graphical control element being activated based on a visual cursor hovering over the graphical control element without user selection of the graphical control element. Examples of block 903 (and the process 900) are described with respect to FIG. 4B when embodiments receive an indication that the cursor 410 has hovered over the icon 406-1. The "graphical control element" can refer to the data object or boundaries of the data object itself, such as an icon or any area included in or within the data object. "Without user selection" means that the user does not explicitly click on, touch, or otherwise select the graphical control element. In some embodiments, block 903 includes the functionality as described with respect to the mouseover detector 304, 610, 612, and/or 614 of FIG. 6, and/or the user engagement detector 204 of FIG. 2.

Per block 905, some embodiments request a window handle (e.g., a window ID) from a client application. In some embodiments, such functionality includes or is described with respect to 360 of FIG. 3 and/or 616 of FIG. 6. A "handle" is a unique identifier. In some embodiments, such request for a window handle can include or be supplemented with a request for how the client application wants the operating system to display or present an application window within the flyout window (such as via a thumbnail).

Per block 907, some embodiments receive the window handle from the client application. In some embodiments, this includes or represents the functionality as described by 362 of FIG. 3 and/or the signal for command availability 620 of FIG. 6. In some embodiments, the receiving of the window handle includes or is supplemented with an indication for how the client application wants the operating system to display or present the corresponding application window within the flyout window.

Per block 909, based on the receiving of the window handle, some embodiments cause presentation of a flyout window that includes a first user interface element for sharing the application window. Examples of this are described with respect to the production of the flyout window 404, along with the "share" button 430 of FIG. 4B.

Figure 10:
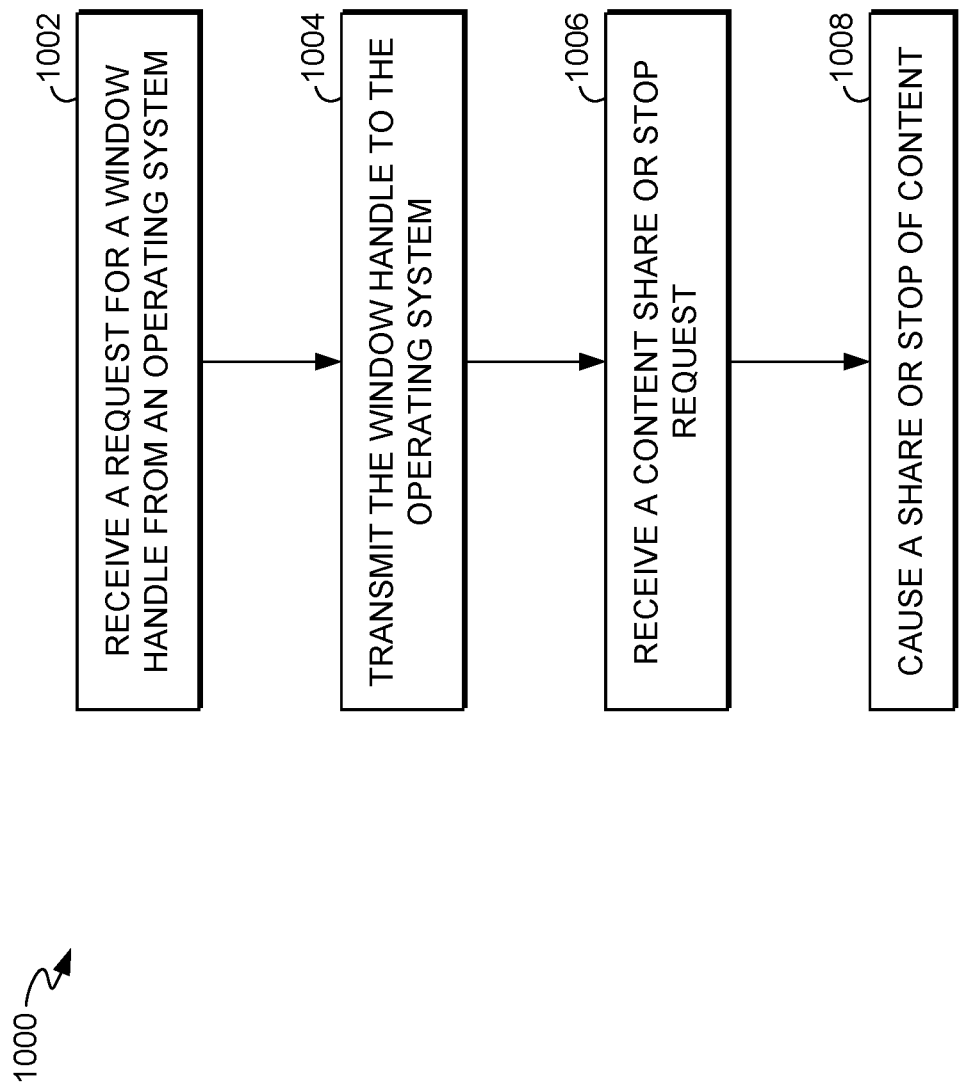
FIG. 10 is a flow diagram for an example process for sharing or stopping the sharing of content, according to some embodiments.

FIG. 10 is a flow diagram for an example process 1000 for sharing or stopping the share of content, according to some embodiments. In some embodiments, the process 1000 is performed by the client application 342 of FIG. 3. In some embodiments, functionality described with respect to FIG. 5 occurs before the process 900. Per block 1002, some embodiments receive a request for a window handle from an operating system. In some embodiments, this includes the functionality as described with respect to the window handle producer 346 receiving the request via 360 and/or the share content command source 608 receiving the request corresponding to 616. In some embodiments, 1002 represents receiving of the request at block 905 of FIG. 9.

Per block 1004, some embodiments transmit the operating system handle to the operating system 1004. In some embodiments, this includes the functionality as described with respect to the window handle producer 346 providing the window handle via 362, the callback with window ID 618, and/or the producing of the window handle such that the operating system receives it via block 907 of FIG. 9.

Per block 1006, some embodiments receive a content share or stop request. In some embodiments, this includes the functionality as described with respect to the content sharing producer 348 receiving a request from the content sharing confirmatory 310, and/or the share content command source 608 receiving the content share/stop request 706 of FIG. 7.

Per block 1008, some embodiments cause as stop or share of content. In some embodiments, this includes the functionality as described with respect to the content sharing producer 348, the content sharing stopper 352, the content sharing module(s) 206, and/or the content sharing stop module(s) 214.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

Other Embodiments

In some embodiments, a computerized system, such as the computerized system described in any of the embodiments above, comprise at least one computer processor, one or more computer storage media storing computer-useable instructions that, when used by the at least one computer processor, cause the at least one computer processor to perform operations. The operations comprise: establishing a connection between an operating system shell of an operating system and a client application, the client application being configured to facilitate electronic communication between a plurality of users; subsequent to the establishing of the connection, receiving an indication of user engagement of a first data object included in an operating system component of the operating system shell, the first data object being associated with a first content item, the user engagement being associated with a user request to share the first content item to the plurality of users via the client application; and at least partially in response to the receiving of the indication, automatically causing the first content item to be provided to a plurality of user devices associated with the plurality of users.

Advantageously, these and other embodiments of the computerized system, as described herein, improve existing technologies because they reduce drill down and navigation within the user interface required for content sharing such that they are not as complex and arduous to use thereby improving human-computer interaction. Such reduction in drilling and navigation occurs because particular embodiments allow users to directly share content items via a single user selection (or fewer user selections) of a data object within an operating system component without requiring any user selections or interface with the client application itself. Accordingly, one technical solution is the concept of receiving an indication of user engagement of a particular data object included in the operating system component, where the user engagement is associated with a user request to share the content item to various users.

Particular associated embodiments of the computerized system also improve the accuracy, user privacy, as well as computer security with respect to sharing content relative to existing technologies. As described herein, particular embodiments provide an "are you sure" or confirmation button confirming that the user wants to share a particular screen or an individual content item of a screen. Accordingly, another technical solution is receiving an indication that a user interface element has been selected, where the user interface element corresponds to a confirmation that the user wants to share a particular content item. Such confirmation button also acts as an access control mechanism such the user is less likely to accidentally share the user's entire desktop screen or other content items, thereby reducing the likelihood that sensitive information, such as passphrases, email content, and the like will be shared.

Particular associated embodiments of the computerized system also improve human-computer interaction and accuracy of content sharing by causing presentation of content via a selection of data objects within a task bar and/or other operating system components, such as a popup or flyout window. In various embodiments, task bars efficiently indicate, to users, which applications are currently running and are available to be shared because of the icons that make them easily distinguishable. Accordingly, another technical solution is the usage of task bars or other operating system components, such as flyout windows, to share content items. In this way, users are more likely to accurately identify the content they want to share relative to the application page previews of existing technologies.

Particular embodiments of the computerized system also improve computer resource consumption, such as reducing I/O, relative to existing technologies. As described herein, various embodiments require less drill down, navigation, and other user input steps, which means that the storage device is accessed fewer times, thereby reducing wear on read/write head or other memory access components. Accordingly, a technical solution is the incorporation of data objects, such as task bar icons, task bars, flyout windows, or other operating system components for content sharing so that the user can directly share content via a selection or user engagement of these components, as opposed to requiring additional drilling and navigation at the client application itself.

In any combination of the above embodiments of the computerized system, the operating system component is one of: a task bar component of the operating system shell, a task switch component of the operating system shell, or a flyout window of the operating system shell.

In any combination of the above embodiments of the computerized system, the first data object is a first icon, among a plurality of icons, in a task bar component, and wherein each icon represents a respective application window, of a plurality of application windows, the first content item representing a first application window, of the plurality of application windows.

In any combination of the above embodiments of the computerized system, the establishing of the connection occurs in response to receiving another indication that a meeting or communication session associated with the client application and the plurality of users has begun.

In any combination of the above embodiments of the computerized system, the operations further comprising: prior to the receiving of the indication, receiving a second indication that a graphical control element included in the first data object has been activated based on a visual cursor hovering over the graphical control element without user selection of the graphical control element; and in response to the receiving of the second indication, causing presentation of a flyout window, the flyout window including a view of the first content item and a first user interface element.

In any combination of the above embodiments of the computerized system, the operations further comprising: in response to receiving a third indication that the first user interface element has been selected, causing presentation of a second user interface element; and receiving a fourth indication of a selection of the second user interface element, the selection of the second user interface element corresponds to a confirmation that a user wants to share the first content item and the selection of the second user interface element further corresponds to the causing of the first content item to be provided to the plurality of user devices.

In any combination of the above embodiments of the computerized system the operations further comprising: in response to the causing of the first content item to be provided to the plurality of user devices associated with the plurality of users, automatically causing display of a first user interface element, a selection of the first user interface element corresponding to a stopping of the sharing of the first content to the plurality of users; and in response to receiving another indication that the first user element has been selected, refraining from causing the first content to be provided to the plurality of user devices.

In any combination of the above embodiments of the computerized system, the operations further comprising: at least partially in response to the receiving of the indication of the user engagement of the first data object, causing an indicator to be displayed at the first data object, the indicator indicating that the first content item, among a plurality of content items, is the content item being shared to the plurality of users.

In any combination of the above embodiments of the computerized system, the operations further comprising: receiving a second indication of user engagement of a second data object included in the operating system component of the operating system shell, the second data object being associated with a second content item, the user engagement of the second data object being associated with a user request to share the second content item to the plurality of users via the client application; and in response to the receiving of the second indication, automatically halting the sharing of the first content item and automatically causing the second content item to be provided to the plurality of user devices associated with the plurality of users.

In any combination of the above embodiments of the computerized system, the operations further comprising: determining that the connection is no longer established between the operating system shell and the client application; receiving a second indication of user engagement of the first data object included in the operating system component; and based on the connection no longer being established between the operating system shell and the client application and in response to the receiving of the second indication, causing display at a first user device of the first content item, wherein the user engagement of the first data object no longer causes the first content item to be provided to the plurality of user devices.

In some embodiments, a computer-implemented method, such as the computer-implemented method described in any of the embodiments above, comprises: receiving a first indication that a graphical control element included in a first data object of an operating system component has been activated, the graphical control element being activated based on a visual cursor hovering over the graphical control element without user selection of the graphical control element; in response to the receiving of the first indication, automatically causing presentation of a first user interface element within the operating system component, a selection of the first user interface element corresponding to a user request to share a first content item to a plurality of users; and at least partially in response to receiving a second indication of a user selection of the first user interface element, automatically causing the first content item to be provided to one or more user devices associated with the plurality of users.

Advantageously, these and other embodiments of the computer-implemented method, as described herein, improve existing technologies because they reduce drill down and navigation within the user interface required for content sharing such that they are not as complex and arduous to use thereby improving human-computer interaction. Such reduction in drilling and navigation occurs because particular embodiments allow users to directly share content items via a single user selection (or fewer user selections) of a data object within an operating system component without requiring any user selections or interface with the client application itself. Accordingly, one technical solution is the concept of receiving an indication of user engagement of a particular data object included in the operating system component, where the user engagement is associated with a user request to share the content item to various users.

Particular associated embodiments of the computer-implemented method also improve the accuracy, user privacy, as well as computer security with respect to sharing content relative to existing technologies. As described herein, particular embodiments provide an "are you sure" or confirmation button confirming that the user wants to share a particular screen or an individual content item of a screen. Accordingly, another technical solution is receiving an indication that a user interface element has been selected, where the user interface element corresponds to a confirmation that the user wants to share a particular content item. Such confirmation button also acts as an access control mechanism such the user is less likely to accidentally share the user's entire desktop screen or other content items, thereby reducing the likelihood that sensitive information, such as passphrases, email content, and the like will be shared.

Particular associated embodiments of the computer-implemented method also improve human-computer interaction and accuracy of content sharing by causing presentation of content via a selection of data objects within a task bar and/or other operating system components, such as a popup or flyout window. In various embodiments, task bars efficiently indicate, to users, which applications are currently running and are available to be shared because of the icons that make them easily distinguishable. Accordingly, another technical solution is the usage of task bars or other operating system components, such as flyout windows, to share content items. In this way, users are more likely to accurately identify the content they want to share relative to the application page previews of existing technologies.

Particular embodiments of the computer-implemented method also improve computer resource consumption, such as reducing I/O, relative to existing technologies. As described herein, various embodiments require less drill down, navigation, and other user input steps, which means that the storage device is accessed fewer times, thereby reducing wear on read/write head or other memory access components. Accordingly, a technical solution is the incorporation of data objects, such as task bar icons, task bars, flyout windows, or other operating system components for content sharing so that the user can directly share content via a selection or user engagement of these components, as opposed to requiring additional drilling and navigation at the client application itself.

In any combination of the above embodiments of the computer-implemented method, the operating system component is one of: a task bar component of an operating system shell, a task switch component of the operating system shell, or a flyout window of the operating system shell.

In any combination of the above embodiments of the computer-implemented method, the first data object is a first icon, among a plurality of icons, in a task bar component, and wherein each icon represents a respective application window, of a plurality of application windows, the first content item representing a first application window, of the plurality of application windows.

In any combination of the above embodiments of the computer-implemented method, the method further comprises: receiving another indication that a meeting or communication session associated with a client application has begun; and in response to the receiving of the another indication, establishing, prior to the receiving of the first indication, a connection between an operating system shell and the client application, the client application being configured to facilitate electronic communication between a plurality of users, and wherein the establishing of the connection occurs in response to receiving another indication that a meeting or communication session associated with the client application and the plurality of users has begun.

In any combination of the above embodiments of the computer-implemented method, the first user interface element includes a button within a flyout window to share the first content item to the plurality of users.

In any combination of the above embodiments of the computer-implemented method, the method further comprises: in response to receiving the second indication of the user selection of the first user interface element, causing presentation of a second user interface element; and receiving a third indication of a selection of the second user interface element, the selection of the second user interface element corresponds to a confirmation that a user wants to share the first content item and the selection of the second user interface element further corresponds to the causing of the first content item to be provided to the plurality of user devices.

In any combination of the above embodiments of the computer-implemented method, the method further comprises: in response to the causing of the first content item to be provided to the plurality of user devices associated with the plurality of users, automatically causing display of a second user interface element, a selection of the second user interface element corresponding to a stopping of the sharing of the first content to the plurality of users; and in response to receiving another indication that the second user element has been selected, refraining from causing the first content to be provided to the plurality of user devices.

In any combination of the above embodiments of the computer-implemented method, the method further comprises: at least partially in response to the receiving of the second indication of the user selection of the first user interface element, causing an indicator to be displayed at the first data object, the indicator indicating that the first content item, among a plurality of content items, is the content item being shared to the plurality of users.

In some embodiments, one or more computer storage media, such as the computer storage media described in any of the embodiments above, having computer-executable instructions embodied thereon that, when executed, by one or more processors, cause the one or more processors to perform operations comprising: receiving a first indication that a meeting or communication session associated with a client application has begun, the client application being configured to facilitate electronic communication between a plurality of users; in response to the receiving of the first indication, causing a connection between an operating system shell of an operating system and the client application to be established; receiving a second indication of user engagement of a first data object included in an operating system component of the operating system shell, the first data object being associated with a first content item, the user engagement being associated with a user request to share the first content item to the plurality of users via the client application based on the connection being established; and based on the connection being established and at least partially in response to the receiving of the second indication, automatically causing the first content item to be provided to a plurality of user devices associated with the plurality of users.

Advantageously, these and other embodiments of the one or more computer storage media, as described herein, improve existing technologies because they reduce drill down and navigation within the user interface required for content sharing such that they are not as complex and arduous to use thereby improving human-computer interaction. Such reduction in drilling and navigation occurs because particular embodiments allow users to directly share content items via a single user selection (or fewer user selections) of a data object within an operating system component without requiring any user selections or interface with the client application itself. Accordingly, one technical solution is the concept of receiving an indication of user engagement of a particular data object included in the operating system component, where the user engagement is associated with a user request to share the content item to various users.

Particular associated embodiments of the one or more computer storage media also improve the accuracy, user privacy, as well as computer security with respect to sharing content relative to existing technologies. As described herein, particular embodiments provide an "are you sure" or confirmation button confirming that the user wants to share a particular screen or an individual content item of a screen. Accordingly, another technical solution is receiving an indication that a user interface element has been selected, where the user interface element corresponds to a confirmation that the user wants to share a particular content item. Such confirmation button also acts as an access control mechanism such the user is less likely to accidentally share the user's entire desktop screen or other content items, thereby reducing the likelihood that sensitive information, such as passphrases, email content, and the like will be shared.

Particular associated embodiments of the one or more computer storage media also improve human-computer interaction and accuracy of content sharing by causing presentation of content via a selection of data objects within a task bar and/or other operating system components, such as a popup or flyout window. In various embodiments, task bars efficiently indicate, to users, which applications are currently running and are available to be shared because of the icons that make them easily distinguishable. Accordingly, another technical solution is the usage of task bars or other operating system components, such as flyout windows, to share content items. In this way, users are more likely to accurately identify the content they want to share relative to the application page previews of existing technologies.

Particular embodiments of the one or more computer storage media also improve computer resource consumption, such as reducing I/O, relative to existing technologies. As described herein, various embodiments require less drill down, navigation, and other user input steps, which means that the storage device is accessed fewer times, thereby reducing wear on read/write head or other memory access components. Accordingly, a technical solution is the incorporation of data objects, such as task bar icons, task bars, flyout windows, or other operating system components for content sharing so that the user can directly share content via a selection or user engagement of these components, as opposed to requiring additional drilling and navigation at the client application itself.

In any combination of the above embodiments of the one or more computer storage media, the operating system component is a task bar, and wherein the first data object is a first icon, among a plurality of icons, in the task bar component, and wherein each icon represents a respective application window, of a plurality of application windows, the first content item representing a first application window, of the plurality of application windows.

Example Computing Device

Figure 11:
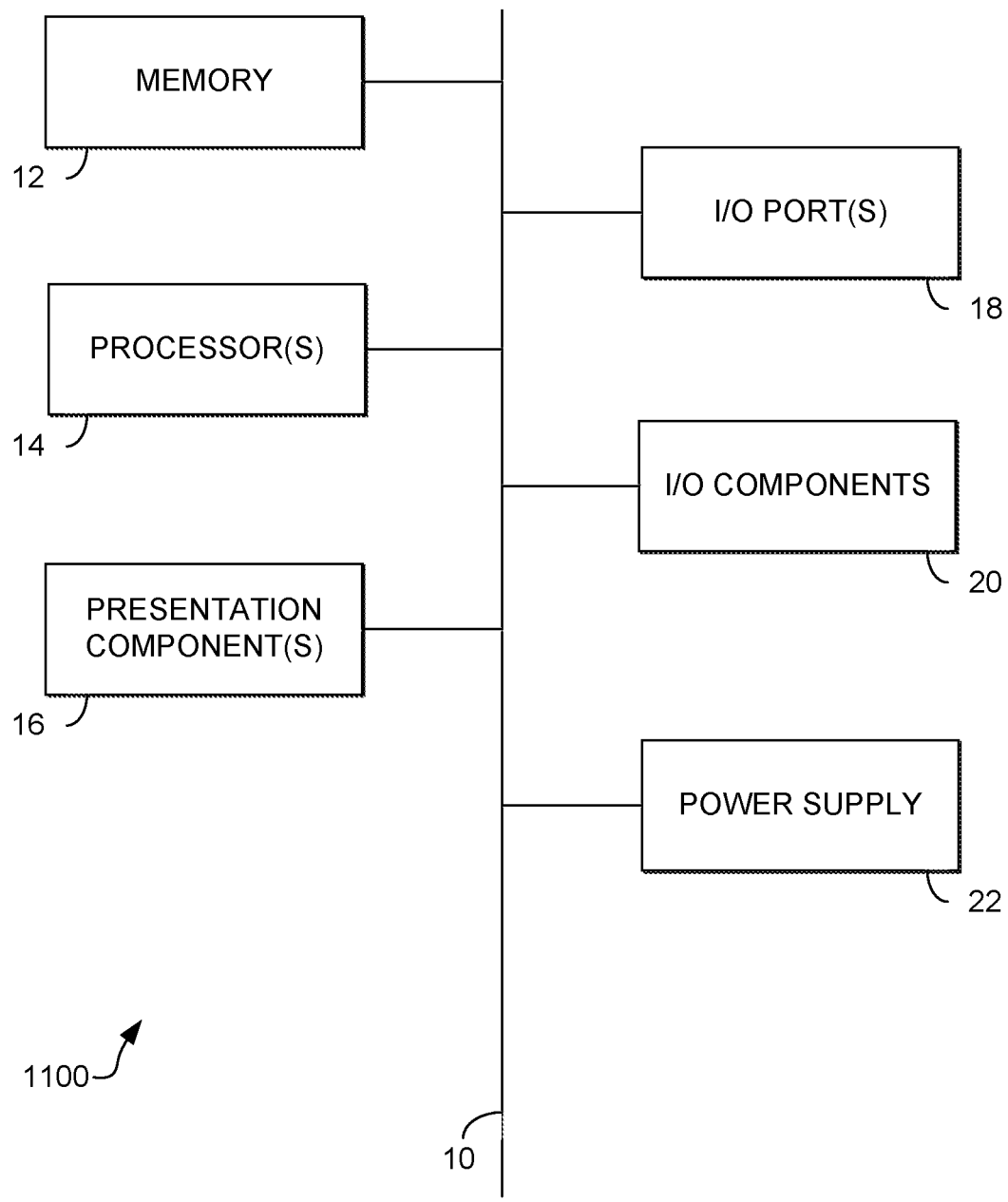
FIG. 11 is a block diagram of an example computing device suitable for use in implementing some embodiments described herein.

Having described various implementations, an exemplary computing environment suitable for implementing embodiments of the disclosure is now described. With reference to FIG. 11, an exemplary computing device is provided and referred to generally as computing device 1100. The computing device 1100 is but one example of a suitable computing environment and is not intended to suggest any limitation as to the scope of use or functionality of embodiments of the disclosure. Neither should the computing device 1100 be interpreted as having any dependency or requirement relating to any one or combination of components illustrated.

Turning to FIG. 11, computing device 1100 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 1100 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 1100 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 may include one or more radio(s) 24 (or similar wireless communication components). The radio 24 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
   at least one computer processor; and
   one or more computer storage media storing computer-useable instructions that, when used by the at least one computer processor, cause the at least one computer processor to perform operations comprising:
   establishing a connection between an operating system shell of an operating system of a user device and a first client application on the user device, the first client application being a source for sharing content and being configured to facilitate electronic audio-visual communication between a plurality of users that enables the plurality of users to hear each other speak and see each other in near real-time;

subsequent to the establishing of the connection and prior to any content item being shared by any of the plurality of users, receiving an indication of user engagement of a first data object included in an operating system component of the operating system shell, the operating system component visually indicating which applications are currently running on the user device, the first data object representing a first content item of a second client application on the user device;

based at least in part on the establishing of the connection, interpreting the user engagement of the first data object as a user request to share the first content item to the plurality of users, wherein user engagement of the first data object prior to the establishing of the connection corresponds to at least one of an operating system request to open the second application or an operating system request to display a page view of the second application; and based at least in part on the interpreting of the user engagement of the first data object as the user request to share the first content item to the plurality of users, automatically causing the first content item to be shared to a plurality of user devices associated with the plurality of users via the first client application, the sharing of the first content item including producing a near-real-time video feed or stream of data indicating a visual view of a page of the second client application and an action a user is taking at the page.

2. The system of claim 1, wherein the operating system component is one of: a task bar component of the operating system shell, a task switch component of the operating system shell, or a flyout window of the operating system shell.

3. The system of claim 1, wherein the first data object is a first icon, among a plurality of icons, in a task bar component, and wherein each icon represents a respective application window, of a plurality of application windows, the first content item representing a first application window, of the plurality of application windows.

4. The system of claim 1, wherein the establishing of the connection between an operating system shell of the operating system and the first client application occurs automatically in response to receiving another indication that a meeting between the plurality of user has begun.

5. The system of claim 1, wherein the operations further comprising:
prior to the receiving of the indication, receiving a second indication that a graphical control element included in the first data object has been activated based on a visual cursor hovering over the graphical control element without user selection of the graphical control element; and
in response to the receiving of the second indication, causing presentation of a flyout window, the flyout window including a view of the first content item and a first user interface element.

6. The system of claim 5, wherein the operations further comprising:
in response to receiving a third indication that the first user interface element has been selected, causing presentation of a second user interface element; and
receiving a fourth indication of a selection of the second user interface element, the selection of the second user interface element corresponds to a confirmation that a user wants to share the first content item and the selection of the second user interface element further corresponds to the causing of the first content item to be provided to the plurality of user devices.

7. The system of claim 1, wherein the operations further comprising:
in response to the causing of the first content item to be provided to the plurality of user devices associated with the plurality of users, automatically causing display of a first user interface element, a selection of the first user interface element corresponding to a stopping of the sharing of the first content to the plurality of users; and
in response to receiving another indication that the first user element has been selected, refraining from causing the first content to be provided to the plurality of user devices.

8. The system of claim 1, wherein the operations further comprising:
at least partially in response to the receiving of the indication of the user engagement of the first data object, causing an indicator to be displayed at the first data object, the indicator indicating that the first content item, among a plurality of content items, is the content item being shared to the plurality of users.

9. The system of claim 1, wherein the operations further comprising:
receiving a second indication of user engagement of a second data object included in the operating system component of the operating system shell, the second data object being associated with a second content item, the user engagement of the second data object being associated with a user request to share the second content item to the plurality of users via the first client application; and
in response to the receiving of the second indication, automatically halting the sharing of the first content item and automatically causing the second content item to be provided to the plurality of user devices associated with the plurality of users.

10. The system of claim 1, wherein the operations further comprising:
determining that the connection is no longer established between the operating system shell and the first client application;
receiving a second indication of user engagement of the first data object included in the operating system component; and
based on the connection no longer being established between the operating system shell and the first client application and in response to the receiving of the second indication, causing display at a first user device of the first content item, wherein the user engagement of the first data object no longer causes the first content item to be provided to the plurality of user devices.

11. A computer-implemented method comprising:
establishing a connection between an operating system component of an operating system stored to a user device and a first client application stored to the user device, the first client application being a source for sharing content and being configured at least partially to facilitate electronic audio communication and electronic visual communication that enables a plurality of users to hear each other speak and see each other in near real-time;

subsequent to the establishing of the connection and prior to any content item being shared, receiving an indication of user engagement of a first data object included within the operating system component, the operating system component visually indicating which applications have not been closed out at the user device, the first data object representing a first content item of a second client application stored to the user device;

based at least in part on the establishing of the connection, interpreting the user engagement of the first data object as a user request to share the first content item to the plurality of users, wherein user engagement of the first data object prior to the establishing of the connection corresponds to at least one of an operating system request to open the second application or an operating system request to display a page view of the second application; and based at least in part on the interpreting of the user engagement of the first data object as the user request to share the first content item to the plurality of users, automatically causing the first content item to be shared to a plurality of user devices associated with the plurality of users, the sharing of the first content item including producing a near-real-time video feed indicating a visual view of a page of the second client application.

12. The computer-implemented method of claim 11, wherein the operating system component is one of: a task bar component of an operating system shell, a task switch component of the operating system shell, or a flyout window of the operating system shell.

13. The computer-implemented method of claim 11, wherein the first data object is a first icon, among a plurality of icons, in a task bar component, and wherein each icon represents a respective application window, of a plurality of application windows, the first content item representing a first application window, of the plurality of application windows.

14. The computer-implemented method of claim 11, wherein the establishing of the connection occurs in response to receiving another indication that a meeting or communication session associated with the first client application and the plurality of users has begun.

15. The computer-implemented method of claim 11, further comprising:
prior to the receiving of the indication, receiving a second indication that a graphical control element included in the first data object has been activated based on a visual cursor hovering over a graphical control element without user selection of the graphical control element; and
in response to the receiving of the second indication, causing presentation of a flyout window, the flyout window including a view of the first content item and a first user interface element.

16. The computer-implemented method of claim 15, further comprising:
in response to receiving a third indication that the first user interface element has been selected, causing presentation of a second user interface element; and
receiving a fourth indication of a selection of the second user interface element, the selection of the second user interface element corresponds to a confirmation that a user wants to share the first content item and the selection of the second user interface element further corresponds to the causing of the first content item to be provided to the plurality of user devices.

17. The computer-implemented method of claim 11, further comprising:
in response to the causing of the first content item to be provided to the plurality of user devices associated with the plurality of users, automatically causing display of a first user interface element, a selection of the first user interface element corresponding to a stopping of the sharing of the first content to the plurality of users; and
in response to receiving another indication that the first user element has been selected, refraining from causing the first content to be provided to the plurality of user devices.

18. The computer-implemented method of claim 11, wherein the operations further comprising:
at least partially in response to the receiving of the indication of the user engagement of the first data object, causing an indicator to be displayed at the first data object, the indicator indicating that the first content item, among a plurality of content items, is the content item being shared to the plurality of users.

19. One or more computer storage media having computer-executable instructions embodied thereon that, when executed, by one or more processors, cause the one or more processors to perform operations comprising:
establishing a connection between an operating system component of an operating system and a client application that are both hosted at a user device, the client application being a source for sharing content and being configured at least partially to facilitate near real-time electronic audio communication and electronic visual communication between a plurality of users;
prior any content item being shared, receiving an indication of user engagement of a first data object included within the operating system component, the operating system component visually indicating which applications are currently running or have not been closed out, the first data object representing a first content item that is hosted at the user device;
based at least in part on the establishing of the connection, interpreting the user engagement of the first data object as a user request to share the first content item to the plurality of users, wherein user engagement of the first data object prior to the establishing of the connection corresponds to at least one of an operating system request to open a second client application or an operating system request to display a page view of the second client application; and
based at least in part on the interpreting of the user engagement of the first data object as the user request to share the first content item to the plurality of users, automatically causing the first content item to be shared to a plurality of user devices associated with the plurality of users, the sharing of the first content item including producing a near-real-time video feed or stream of data indicating a visual view of a page of the second client application.

20. The one or more computer storage media of claim 19, wherein the operations further comprising:
receiving a second indication of user engagement of a second data object included in the operating system component, the second data object being associated with a second content item, the user engagement of the second data object being associated with a user request to share the second content item to the plurality of users via the client application; and in response to the receiving of the second indication, automatically halting the sharing of the first content item and automatically causing the second content item to be provided to the plurality of user devices associated with the plurality of users.

\* \* \* \* \*